(12) United States Patent
Forestelli

(10) Patent No.: US 11,921,009 B2
(45) Date of Patent: Mar. 5, 2024

(54) METHOD AND APPARATUS FOR DETECTING LEAKAGES FROM SEALED CONTAINERS

(71) Applicant: FT SYSTEM SRL, Alseno (IT)

(72) Inventor: Fabio Forestelli, Alseno (IT)

(73) Assignee: FT SYSTEM S.R.L., Alseno (IT)

( * ) Notice: Subject to any disclaimer, the term of this patent is extended or adjusted under 35 U.S.C. 154(b) by 124 days.

(21) Appl. No.: 17/611,209

(22) PCT Filed: May 14, 2020

(86) PCT No.: PCT/IB2020/054554
§ 371 (c)(1),
(2) Date: Nov. 15, 2021

(87) PCT Pub. No.: WO2020/230066
PCT Pub. Date: Nov. 19, 2020

(65) Prior Publication Data
US 2022/0228944 A1    Jul. 21, 2022

(30) Foreign Application Priority Data
May 16, 2019  (IT) .......................... 102019000006918

(51) Int. Cl.
*G01M 3/22*  (2006.01)
(52) U.S. Cl.
CPC ............ *G01M 3/229* (2013.01); *G01M 3/227* (2013.01)
(58) Field of Classification Search
CPC .............................. G01M 3/227; G01M 3/229
See application file for complete search history.

(56) References Cited

U.S. PATENT DOCUMENTS

| 3,091,114 | A | | 5/1963 | Webster |
| 3,708,949 | A | | 1/1973 | Wilcox |
| 5,010,761 | A | * | 4/1991 | Cohen .................... G01M 3/229 73/40.7 |
| 9,097,610 | B2 | | 8/2015 | Nilsson |
| 9,625,358 | B2 | * | 4/2017 | Murthy ................ G01N 1/2226 |
| 10,690,564 | B2 | * | 6/2020 | Hann ..................... G01M 3/227 |
| 2019/0170602 | A1 | * | 6/2019 | Gupte ..................... G01M 3/40 |

FOREIGN PATENT DOCUMENTS

| DK | 201570808 A1 | 6/2017 |
| FR | 2522820 A1 | 9/1983 |
| WO | 2013/011329 A2 | 1/2013 |
| WO | 2017/125386 A2 | 7/2017 |

OTHER PUBLICATIONS

International Search Report and Written Opinion of the International Searching Authority issued for International PCT Application No. PCT/IB2020/054554 dated Oct. 22, 2020.

* cited by examiner

*Primary Examiner* — Natalie Huls
(74) *Attorney, Agent, or Firm* — Howson & Howson LLP

(57) ABSTRACT

A method for detecting leakages of fluids from sealed containers includes defining a detection zone in which a sealed container will be placed, putting the detection zone in communication with at least one gas sensor through at least one duct, introducing a flushing gas into the detection zone through the at least one duct, placing a container in the detection zone, sucking gases from the detection zone through the duct and transferring them to the sensor for ascertaining the presence of a gas leakage in the container.

19 Claims, 14 Drawing Sheets

METHOD AND APPARATUS FOR DETECTING LEAKAGES FROM SEALED CONTAINERS

TECHNICAL FIELD

The invention concerns a method and an apparatus for detecting leakages from sealed containers. The method and the apparatus according to the invention are capable of detecting fluid leakages of fluids from sealed containers. More particularly, but not exclusively, said fluids can be in gas or vapour state and can consist of gases or gas mixtures, or of vapours or vapour mixtures, or of gas and vapour mixtures. Said containers can be both rigid containers, such as for instance glass jars or bottles, and containers having at least one flexible wall portion, such as for instance plastic tubs, bags and flexible packages of different kinds.

PRIOR ART

At present, many beverages and products intended for use as food, of for other uses, are preserved by mainly using one of the following packaging ways.

According to a first way, mainly used for preserving liquids, a rigid or semi-rigid container is filled with the substance to be preserved through a suitable opening provided for in the container. Subsequently, the opening is sealed by means a suitable closing element, for instance a cap. In other cases, the product to be preserved is wrapped by means of ribbons or films or is introduced into tubes of flexible plastic material, and subsequently the package thus obtained is sealed by welding along one or more junction lines. In still other cases, it is known to use tubs of plastic material formed in advance. The tubs are filled through an opening provided therein and subsequently the opening is sealed by means of a plastic film welded to the tub walls.

More generally, food products, but non only, are preserved in sealed packages aimed at preserving as long as possible unchanged in time the chemical-physical characteristics the product has at the packaging time.

Thus, one of the main problems encountered in applying the aforesaid methods is how to obtain an optimal sealing of the package in order to avoid contaminations with the outside environment. In many applications, an optimal sealing results in a closure that has to be substantially hermetic at the outside pressure at which the package is kept, or anyway at the pressure the package is subjected to during its normal use, transportation and storage. For instance, in case of food products, the package has to be substantially hermetic when it is at atmospheric pressure, to prevent the environment inside the package from communicating with the outside environment thereby causing substance and air to pass from one environment to the other, and hence to prevent the risk of contaminating the packaged product and the decay of its organoleptic properties.

In case of containers sealed by welding, the hermetic sealing of the package can be jeopardised for instance by an imperfect welding due for instance to a wrong execution of the welding process. Errors in setting the welding temperature, a wrong choice in the adhesive weld material, the imperfect planarity of the contacting surfaces in the welding area and the presence of impurities or foreign bodies in the welding area are all factors that can compromise the attainment of a hermetic sealing of the container.

In case of rigid or semi-rigid containers, such as bottles, which are closed by a cap, as well known, the hermetic sealing can be jeopardised for instance by a malformation of the same cap or of the bottle, in the region where the cap is to be applied, or by operation problems of the capping machine, for instance problems of alignment in the cap application step.

Generally, losses of substance from containers occurring because of apparent imperfections in the container closure can be easily detected, even visually, by a heedful operator. Such losses generally entail an evident spillage of substance from the container. Under such circumstances, therefore, a heedful operator, in charge of the supervision of a packaging line, can easily identify imperfect containers and remove them, if necessary, immediately downstream of the filling and sealing step, mainly in order to discard them and to prevent them from being offered to the consumer, or to submit them to further checks or to repairs.

As it can be easily understood, detection of leakages from the containers is the more difficult for the operator the smaller is the leakage, as is the case of a leakage due to micro-cracks and micro-holes. Those leakages are defined micro-leaks, i.e. leaks of very small amount from the container, which are not immediately detectable since they do not entail an evident spillage of liquids or other substances, but in the long run they can compromise the product quality. Such micro-leaks are generally caused by cracks of the order of some ten microns and even as small as some microns, for instance 3-7 µm.

To solve the problem of how to effectively detect the presence of micro-leaks from sealed containers, several solutions have been hitherto proposed.

A first known solution to the problem of how to detect leakages from heat-sealed containers is disclosed for instance in U.S. Pat. No. 3,708,949 (A). This document discloses a method and an apparatus for forming and subsequently checking the tightness of heat-sealed envelopes. The method disclosed in such a document substantially includes a step in which the container is sealed, after introduction of a modified atmosphere, a step in which the container is submitted to a mechanical stress in order to reduce the volume enclosed by the container walls and consequently increase the pressure of the gases enclosed in the container thereby promoting their spillage if micro-cracks are present, a step in which a gas detector detects the presence, outside the container, of a tracer gas present in the modified atmosphere, and a step in which the container having failed to pass the check is removed.

Another known method for testing the tightness of a thermo-sealed container is disclosed in WO2013/011329 (A2). According to the teaching of this document, the container is filled with a tracer gas and is submitted to compression in order to promote gas spillage through micro-cracks possibly present in the sealing area. Suitable detectors, including pairs of electrodes, are located in the vicinity of the regions of the container where gas micro-leaks are more likely to occur. A change in the electrical voltage at the detector electrodes causes detection of the presence of tracer gas.

WO2017125386 (A2) discloses a method in which a chemical substance, typically in the form of a strip, is applied to the container. The substance is such that its physical and/or chemical properties change depending on the concentration of a gas, for instance oxygen, contacting the substance. The change in the properties of the substance gives rise to a change in the frequency, wavelength or phase of an electromagnetic radiation emitted, detectable by a detector located outside the container.

DK201570808 (A1) discloses an apparatus for detecting gas leaks from sealed containers into which a tracer gas has been introduced. The apparatus includes an analysis chamber, in which the container is received during the hermetic tightness test, and a device capable of creating vacuum inside the chamber. A gas detector is placed in communication with the chamber in order to detect the presence of the tracer gas.

Therefore, according to the teaching of the prior art, the step of detecting micro-leaks is generally performed with the aid of a tracer gas, typically carbon dioxide ($CO_2$), helium (He) or hydrogen ($H_2$), introduced into the container before the latter is sealed. The presence of tracer gas outside the container is generally detected by means of detectors, for instance electrodes, usually when liquids or tracer gases such as He are to be detected, or detectors the operation of which is based on the non-dispersive infrared (NDIR) technique or other techniques, in order to detect $CO_2$ leakages.

In the field of the detection of gas leakages from squeezable sealed containers the problem is also known of how to clean the zone in which the sample to be checked is placed from possible traces of undesired gases, due for instance to the passage of the previous sample or due to contaminations caused by gases coming from the outside environment surrounding the detection zone.

EP2755015 (A1) teaches using the so-called compressed air curtains to clean the detection zone. Moreover, this document also teaches using a plurality of air curtains in order to screen the detection zone from possible flows of outside gases, more particularly $CO_2$, which could contaminate the detection zone thereby altering the leakage detection. According to the specification of this document, air coming from a compressed air source is delivered into the apparatus through a dedicated duct circuitry and is made to exit into the detection zone through a set of nozzles configured so as to define corresponding air curtains or blades, i.e. air flows that, when diffused by suitably shaped openings or slots, are substantially spread over a plane surface and, thanks to the flow speed, maintain such a configuration over a certain distance from the diffusers.

Air curtains are employed for the cleaning, also referred to as flushing, of the detection zone. Yet, the air curtains are located at the beginning and the end of a measurement tunnel and, for clearly apparent reasons of functional interference, they cannot be located in the close vicinity of the suction fans. The effectiveness of the air curtains is therefore only partial and, even assuming that they can be located in the close vicinity of the suction fans—this being a merely theoretical hypothesis—they would not be capable of flushing the inside of the suction ducts. Flushing performed by the air curtains according to the presently known art is thus limited to the detection zone, whereas other portions of the apparatus, such as the ducts communicating with the detectors, generally present in apparatuses of this kind, do not undergo any air change and thus remain potentially contaminated by foreign gases that can be harmful for a correct detection of a leak from a sample container, especially if the leak amount is small or very small and the test is to be carried out very quickly, for instance in order not to slow down the product advance line in an industrial plant.

FR2522820 (A1) discloses a method and an apparatus for detecting gas leakages from a container, in which a bell surrounds a detection zone in the vicinity of the container. During the gas leakage measurement step the, the bell is connected in a closed circuit including a detector capable of measuring the concentration of the gas to be detected. More particularly, the closed circuit includes a first duct connecting a detector outlet to a bell inlet and a second duct connecting a bell outlet to a detector inlet. A circulator, connected in the first duct between the detector and the bell, causes gas circulation inside the circuit. The container is kept under the bell for a long time, so that a progressively increasing amount of gas to be measured becomes accumulated and so that such gas can circulate several times in the circuit and hence through the detector. In order to enable cleaning the detector and the bell before a new measurement, the closed circuit is opened and a gas different from the gas to be measured is made to flow in the first duct. Yet, such a gas is not made to flow in the second duct, which therefore remains potentially contaminated by the gases of the previous measurement.

The aforesaid method provides therefore for a homogenisation of the gas to be tested by means of repeated passages of the same gas in the closed circuit. Moreover, the method taught has the drawback that it does not allow an effective and quick cleaning of the whole apparatus, thereby causing a slowing down of the operations between the measurements of the gas leakages from one container and the subsequent one.

It is a first object of the invention to provide a method and an apparatus for detecting leakages from sealed containers, which are not subject to the limitations and the drawbacks set forth above of the prior art.

It is another object of the invention to provide a method and an apparatus of the above kind that allow detecting leakages from containers of different kinds, of either rigid of flexible type, with or without mechanical squeezing of the container, even in case the leak is of small or very small amount, i.e. it corresponds to a micro-leak, and is caused by an opening of few microns.

It is a further object of the invention to provide a method and an apparatus for detecting leakages from sealed containers allowing an improved operation speed if compared to the prior art, that is a method and an apparatus that allow a faster detection of leakages, if any, and thus allow maximising the operation speed of the production or container processing plant.

It is yet another object of the invention to provide a method and an apparatus of the above kind allowing a higher precision in leakage detection, even in case perturbations or alterations in the conditions of the surrounding environment are present.

It is a further, but not the last object of the invention to provide a method and an apparatus that are reliable and can be used in cheap manner, so that they can have a large scale industrial utilisation.

The above and other objects are achieved by means of the method and the apparatus as claimed in the appended claims.

DESCRIPTION OF THE INVENTION

The method for detecting leakages from sealed containers mainly includes a step in which the container the tightness of which is to be checked is placed in a detection zone, and a step in which air present in said detection zone is sucked through at least one suction duct communicating with said detection zone. According to the invention, the suction step is preceded by a step of flushing the duct and the detection zone, and said flushing step is performed by introducing a flushing gas into the detection zone and by making the flushing gas flow through the same duct mentioned above in a direction opposite to the direction in which air sucked during the suction step flows. Preferably moreover said detection zone is in communication with the atmosphere.

In an embodiment of the invention, the suction step and the flushing step are performed by means of a suction fan having a suction port communicating with the duct and by means of a blower having an outlet port communicating with the same duct, respectively. An electromechanical valve, for instance a three-way valve, is further provided in order to put the duct in communication with the suction fan during the suction step, and with the blower during the flushing step. The same three-way valve closes the communication between the duct and the blower during the suction step, and the communication between the duct and the suction fan during the flushing step. Thus, according to this embodiment, air suction from the detection zone and flushing are performed by means of two separate and independent units, namely a suction fan and a blower, respectively, which are put in exclusive communication with the duct and the detection zone for instance through a three-way valve. Preferably, in said introduction step, the flushing gas introduced into the detection zone is taken from a controlled environment containing said flushing gas, and in said suction step gas sucked from the detection zone is exhausted to a non-controlled environment.

In an alternative embodiment of the invention, air suction from the detection zone and flushing are performed by means of a single unit that acts therefore both as a suction fan and as a blower. The unit is connected to a circuit equipped with a valve arranged to put in communication:
  the duct communicating with the detection zone with the inlet port of the unit, and the outlet port of the unit with the outside environment (in the step of air suction from the detection zone), or, in the alternative
  the duct communicating with the detection zone with the outlet port of the unit, and the inlet port of the unit with a controlled environment containing a flushing gas or gas mixture (in the flushing step).

In a further embodiment of the invention, air suction from the detection zone and flushing are performed by means of a single reversible unit, capable of alternatively operating either as a suction fan or as a blower by reversing the motion of the blades of single impeller. Also in this embodiment, preferably, the single reversible unit exhausts the sucked gas to the outside environment in the suction step, whereas it takes the flushing gas from a controlled environment containing it in the flushing step.

According to a preferred embodiment of the invention, at least one gas sensor is provided along the suction and flushing duct, between the detection zone and the suction unit or the blower, which sensor is arranged to generate an electrical signal indicative of the presence of a given gas or gas mixture in the air flow that flows through the duct coming from the detection zone and licks said sensor.

Thus, according to the invention, the method for detecting leakages preferably includes the steps of:
  defining a detection zone in which a sealed container will be placed;
  putting said detection zone in communication with a gas sensor through a duct;
  introducing a flushing gas or gas mixture into the detection zone, by making the flushing gas or gas mixture flow through said duct in a first direction;
  placing a container in said detection zone;
  sucking a gas sample from said detection zone and transferring it to the sensor for ascertaining the presence of a gas leakage in said container, said gas being transferred from said detection zone to said sensor by making it flow through said duct in a second direction opposite to said first direction.

According to the invention, the step of placing said container in the detection zone can take place before or after the introduction of the flushing gas. Preferably, however, flushing gas introduction into the detection zone is stopped after the container to be checked has been placed in the detection zone.

According to a particular aspect of the invention, the step of defining a detection zone arranged to receive a sealed container to be checked and the flushing step are performed so as to generate a gas atmosphere with constant concentrations and substantially free from turbulences in said detection zone. According to the invention, the atmosphere containing one or more gases with constant concentrations and free from turbulences can be obtained by forming an environment with a mixture as far as possible similar to gas concentrations in the atmosphere, or by introducing into the detection zone, preferably by means of a diffuser, a gas or gas mixture preferably coming from a controlled environment, which is free from the gas to be detected or in which said gas is present in a limited and stable concentration. According to the invention, the gas flow introduced into the detection zone must preferably be a flow that is as far as possible laminar and free from turbulences.

In accordance with a preferred embodiment of the invention, the container is made to displace on a conveyor belt inside a tunnel in which one or more diffusers are provided, which preferably are positioned so as to analyse the whole contour of the sample while the belt is advancing, in order to monitor the existence of possible leaks in any portion of the same container.

According to the invention, moreover, squeezing means are preferably provided for promoting a possible gas spillage from the container when the latter is in the detection zone. Moreover, means for discarding the container depending on the result of the check carried out can be provided downstream of the detection zone.

According to this first aspect, the invention allows detecting gas micro-leaks from sealed containers when the concentration of a tracer gas in the atmosphere inside the container is different from that in the surrounding environment.

Moreover, the invention also optionally provides for the possibility of modifying the concentration of the gas mixture present in the atmosphere in the vicinity of the container. Thus, the invention allows detecting gas micro-leaks from containers, when the tracer gas concentration in the atmosphere inside the container is the same as that in the surrounding environment before said modification.

Referring by way of example to $CO_2$ as an example of tracer gas introduced into the container before sealing it, the invention provides, in accordance with the first aspect described, for a presence of $CO_2$ inside the container in a concentration exceeding the atmospheric one (typically 400 ppm) and, in accordance with the second aspect described, for substantially the same concentration of $CO_2$ as the atmospheric one. In the second case, as stated before, the invention provides for defining a modified atmosphere, i.e. an atmosphere with a reduced concentration of $CO_2$, or free from $CO_2$, in the detection zone. This second aspect of the invention can be achieved for instance by introducing a pure gas such as nitrogen into the detection zone.

Hereinafter, $CO_2$ will be often referred to as tracer gas to be detected; yet the invention can use any other tracer gas, such as $O_2$, $H_2$ and other gases or gas mixtures suitable for the purpose.

In accordance with the invention, the sealed container to be checked is placed in the detection zone preferably by means of a positioning assembly including at least one conveyor belt, or a carrousel, or a conveyor or any other apparatus capable of transferring the container to the detection zone. Said positioning assembly further preferably includes a pair of side guides for correctly placing the container in the detection zone.

The positioning assembly further preferably includes a pair of conveyor belts, for the introduction, or entrance, of the container into the detection zone and for the extraction, or exit, of said container from the detection zone, respectively.

A squeezing assembly, capable of squeezing the sealing container to be checked for promoting gas spillage if a micro-hole is present, can be optionally provided in the detection zone. The squeezing assembly preferably includes a pair of rotatable rollers preferably transversely arranged relative to the advance direction of the product to be checked and having rotation axes substantially parallel to the plane on which the product advances. When the products to be checked advance on a conveyor belt, the rotatable rollers are preferably arranged with their rotation axes transverse to the advance direction of the belt and on a plane parallel to the belt plane. In a preferred embodiment each roller is suspended to a pair of floating arms, connected to a corresponding pneumatic cylinder capable of applying onto the arms, and hence onto the rollers, the pressure suitable for squeezing the container located in the detection zone. A motor for rotating the rollers through a drive belt is provided at the pivotal axis of each arm. The pivotal axes of the arms are fixed relative to the structure of the detection apparatus, whereas the spatial positions of the axes of rotation of the rollers can change depending on the pressure applied by the pneumatic cylinders while a container is passing in the detection zone. The assembly described, comprising an arm, a pneumatic cylinder and the associated roller of the squeezing assembly, defines in the whole a third class lever. An angular potentiometer, capable of generating an electrical signal indicative of the angular position of the arm, and hence, of the position of the roller relative to the sample container present at that moment in the detection zone, is provided at the pivotal axis of each arm onto the stationary structure of the apparatus. Said angular displacement is indicative of the presence of the sample container to be submitted to detection. The angular displacement of the arm and the roller indicates that the sample is present and has been squeezed. Should a sample not be squeezed, for instance a sample arriving in a highly deflated condition, the same sample would be discarded.

According to a preferred embodiment of the invention, the rollers of the squeezing assembly include a cylindrical body where a central portion, bounded by a pair of end plates for lateral protection, is defined. A grooved pulley, which is engaged by a belt transmitting the motion imparted by the motor located in correspondence of the pivotal axis of one of the floating arms to which the roller is suspended, is provided externally of one of the end plates.

Preferably, the central portion of the roller includes, when viewed in cross section and starting from the inside and radially going outwards, a substantially rigid and hollow inner central sleeve, for instance made of steel or aluminium, a soft layer, for instance made of foam rubber, and an external coating of an antislip material, i.e. a material with high grip, for instance natural rubber, capable of exerting a strong friction against the surface of the passing sample container, in order to make it advance without slipping. A shaft, the ends of which are integral with the end plates and the external pulley, is provided inside the central sleeve.

In the alternative, the rollers of the squeezing assembly include a hollow rubber sleeve, the outer surface of which has antislip properties and the cavity of which determines a certain softness and capability of compression by the external radial thrusts due to the resistance to squeezing the sample container opposes while passing under the rollers.

According to a preferred embodiment of the invention, a suction head comprising a plurality of slots for sucking gases is located in the detection zone. Advantageously, the slots are arranged along a peripheral band substantially surrounding the whole sample container while it is passing in the detection zone. The slots are advantageously distributed over a peripheral band lying in a plane substantially perpendicular to the advance direction of the sample. In the whole, the slots are therefore arranged along an upper face, two side faces and a bottom face of said peripheral band. For instance, three upper slots as well as three bottom slots can be provided, whereas a side slot is provided for each side face, totalling two side slots. Moreover, each slot communicates with a respective duct, in turn communicating with a gas sensor.

The detection zone is further equipped with diffusers through which an air curtain or blade is blown, contributing to isolate the detection zone from contamination by gases coming from the surrounding environment.

Taking into account that, according to a preferred embodiment of the invention, the detection head extends along a peripheral band substantially surrounding the whole sample container passing in the detection zone, it is preferable to interrupt the conveyor belt so as to create, at the interruption, a free zone for letting air flow from and to the slots of the bottom face of the slot band. Said conveyor belt thus preferably includes an input section, advancing in a direction towards the detection zone to place the sample into said zone and make it pass internally of the slot band, and an output section, advancing in a direction away from the detection zone, to move the sample out of said zone towards a subsequent destination in a container processing plant. The slots in the bottom face of the peripheral band are located in correspondence of the interruption in the conveyor belt, between the end of the input section and the beginning of the output section. In the alternative, the conveyor belt could be made of an air-permeable material, or other means allowing air flow from and to the detection zone could be used for conveying the sample products.

Preferably, the slots located on the upper face and along the side faces of the detection head are adjustable in height to cope with the presence of containers with different sizes.

Preferably, the slots located along the upper face are obliquely arranged relative to the periphery of the peripheral band and are inclined by an angle ranging from about 15° to 30° relative to the plane of said band. Preferably, the slots located along the side faces of the peripheral band are arranged substantially perpendicular to the respective side face and parallel to the sample advance direction. Preferably, the slots located on the bottom face are parallel to the bottom face and perpendicular to the sample advance direction. Preferably, the bottom slots are defined in a suction assembly, for instance with three channels, one for each slot. The bottom suction assembly has an elongated body with trapezoidal cross-sectional shape. Cavities putting a corresponding slot in communication with a respective gas outlet port are defined inside the elongated body. In the present case, three slots are provided in the whole, and they have a length shorter than that of the elongated body and are arranged on two parallel lines. Moreover, the slots are so offset as to ensure suction continuity over the whole length of the elongated body. The internal cavities of the elongated body, defining the suction ducts for conveying the fluid sucked through the slots towards the respective outlet ports, are configured so as to avoid sharp angles and to promote a laminar flow of the fluid flowing therethrough.

The slots located on the upper face are defined in an upper suction assembly with two channels, one for each slot. The upper suction assembly has an elongated body with an approximately parallelepiped shape. Two cavities putting a corresponding slot in communication with a respective gas outlet port are defined inside the elongated body. Two slots are provided in the whole, and they have a length shorter than that of the elongated body and are obliquely arranged so that there is an overlap of the slot projections on a plane perpendicular to the advance direction of the sample, so as to ensure suction continuity over the whole width of the elongated body. The internal cavities of the elongated body, defining the suction ducts for conveying the fluid sucked through the slots towards the respective outlet ports, are configured so as to avoid sharp angles and to promote a laminar flow of the fluid flowing therethrough.

Preferably, the slots located on each side face are defined in a respective side suction assembly with one channel, one assembly being provided for each side face. The side suction assembly has a prismatic body with approximately parallelepiped shape. A cavity putting a corresponding slot in communication with a respective gas outlet port is defined inside the body. There is a single slot, having about the same length as the suction body and arranged parallel to the advance direction of the sample. The internal cavity of the elongated body, defining the suction ducts for conveying the fluid sucked through the slot towards the respective outlet port, is configured so as to avoid sharp angles and to promote a laminar flow of the fluid flowing therethrough.

A first advantage of the invention is due to the fact that flushing of the detection zone takes place through the same duct as that through which gases are sucked from the detection zone. Therefore, according to the invention, said duct is used in bidirectional manner, that is both for sucking gases from the detection zone and conveying said gases towards the sensor, and for introducing a flushing gas or gas mixture into said detection zone. Such an arrangement enables flushing away in quick manner unwanted gases from both the detection zone in which the samples pass, and from the zone, more critical in respect of the possible presence of unwanted gases, defined by the duct arranged between the detection zone and the sensor and between the sensor and the suction fan. This allows moreover speeding up the operations, without having to wait for the unwanted gases leaving said zones by means of non-forced diffusion to the outside environment. Moreover, always thanks to such an arrangement, also the space in which the sensor is located and the internal space of the same sensor are flushed due to the action of the flushing gas or gas mixture. Thanks to such an arrangement, which minimises the risk that the environment in which the sample passes and the ducts conveying gases towards the sensor are contaminated by unwanted gases due to the passage of the previous sample, the ability to detect leakages of microscopic amount, i.e. micro-leaks, is therefore considerably improved.

Advantageously, the invention allows detecting leakages, even of small amount, that is micro-leaks, of a gas or gas mixture from holes, even of small size, that is micro-holes, with sizes as small as few microns, for instance of the order of 3-7 µm, present by chance on the flexible wall of containers.

Moreover, the invention optionally offers the possibility of implementing a detection method capable of considerably increasing the sensitivity of the detection itself. Such a detection method allows advantageously increasing the detection sensitivity, thus making it possible to detect the presence of small tracer gas concentrations, due to micro-leaks of said tracer gas from the sample container, in the atmosphere present in the detection zone.

Thus, the invention allows detecting gas micro-leaks from containers in which the tracer gas concentration is little higher than that in the outside environment. According to the invention, such a detection method can be implemented in the absence of or in combination with the function of modifying the gas mixture composition in the vicinity of the container.

In accordance with such a further embodiment of the invention, at least two sensors are provided, arranged to generate respective signals indicative of the presence of a tracer gas. Both sensors are passed through in series by the same gas flow sucked from the detection zone and, consequently, the second sensor, i.e. the one located downstream of the first sensor, generates a signal delayed with respect to the first sensor.

In an alternative of such an embodiment, a single sensor is provided and the delay is obtained by making the same gas flow coming from the detection zone pass in the same sensor first in one direction and then in the opposite direction.

BRIEF DESCRIPTION OF THE FIGURES

Some preferred embodiments of the invention will be provided by way of non-limiting examples with reference to the accompanying Figures, in which.

In all Figures, the same reference numerals have been used to denote equal or functionally equivalent components.

DESCRIPTION OF A PREFERRED EMBODIMENT

Figure 1A:
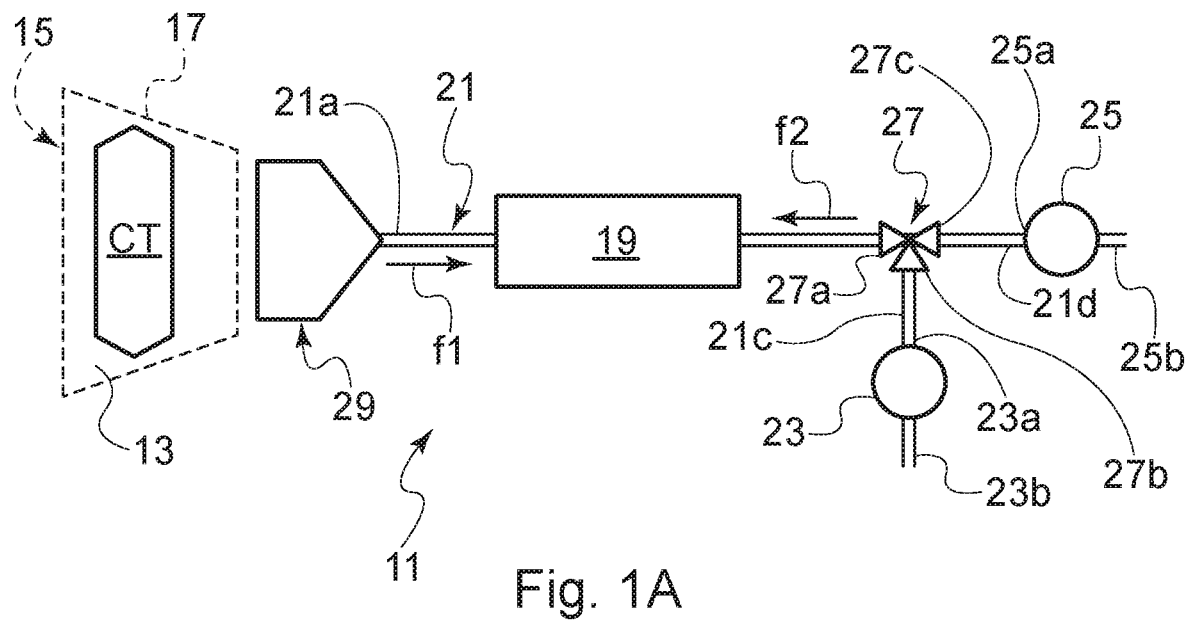
FIGS. 1A to 1F are schematic representations of as many embodiments of the invention.

Referring to FIG. 1A, there is schematically shown a detection apparatus 11 made in accordance with a preferred embodiment of the invention and including a detection zone 13. Detection zone 13 is arranged to receive a sealed container CT that is to be checked for ascertaining the presence of possible leakages, i.e. of openings capable of putting the content of container CT in communication with the surrounding environment outside the container. In accordance with a preferred embodiment of the invention, detection zone 13 is defined by a supporting structure 15 including a frame 17 and it communicates with the outside environment.

Apparatus 11 further includes a gas sensor device 19, arranged to generate an electrical signal indicative of the presence of a specific gas in a gas mixture passing through said sensor 19. In a particular embodiment of the invention said gas is $CO_2$ and sensor 19 is an infrared $CO_2$ sensor including a measurement cell equipped with an IR emitter and a corresponding photodetector. The gas mixture to be analysed, when passing through the measurement cell in sensor 19, causes an alteration in at least one parameter of an electrical signal passing in an electrical circuit associated with the photodetector. The alteration is proportional to the amount of $CO_2$ being present, i.e. to the $CO_2$ concentration in the mixture passing through sensor 19. In other embodiments, gas sensors of different type could be provided to detect $CO_2$ with different modalities, or to detect gases of different kinds, for instance He or $H_2$. Such sensors are known to the skilled in the art and therefore they will not be described in more detail.

Apparatus 11 further includes a duct 21 communicating with detection zone 13 and with said gas sensor 19. According to the invention, and as it will become more apparent from the description below, gases flow through duct 21 in a first direction (arrow f1), from detection zone 13 to sensor 19, in a step of gas suction from said detection zone 13, and in a second direction (arrow f2), opposite to the first one, from sensor 19 to detection zone 13, in a gas flushing step.

According to the embodiment of the invention depicted in FIG. 1A, apparatus 11 includes a flushing gas blower 23 equipped with an outlet port 23a, from which flushing gases exit, communicating with duct 21, and with an inlet port 23b for the inlet of sucked gas, connected to a controlled environment (not shown) containing the flushing gas. In the embodiment illustrated, apparatus 11 further includes a suction fan 25, having an inlet port 25a, through which air is sucked, communicating with said duct 21, and an outlet port 25b for exhausting the air sucked into a non-controlled environment, for instance the outside environment. Always with reference to the embodiment illustrated, duct 21 includes a first segment 21a connected between detection zone 13 and sensor 19, a second segment 21b connected between sensor 19 and a first port of a three-way switching vale 27, and two segments 21c and 21d, connected between a second port 27b of valve 27 and blower 23 and between a third port 27c of valve 27 and suction fan 25, respectively.

In this preferred embodiment of the invention, segment 21a communicates with detection zone 13 through a diffuser 29. According to the invention, a single detection zone 13 could be equipped with a plurality of diffusers 29. For instance, diffusers 29 surrounding container CT passing in zone 13 could be provided, so that substantially the whole of the side surface of container CT passing in zone 13 is submitted to the effect of the air suction by diffusers 29.

Figure 1B:
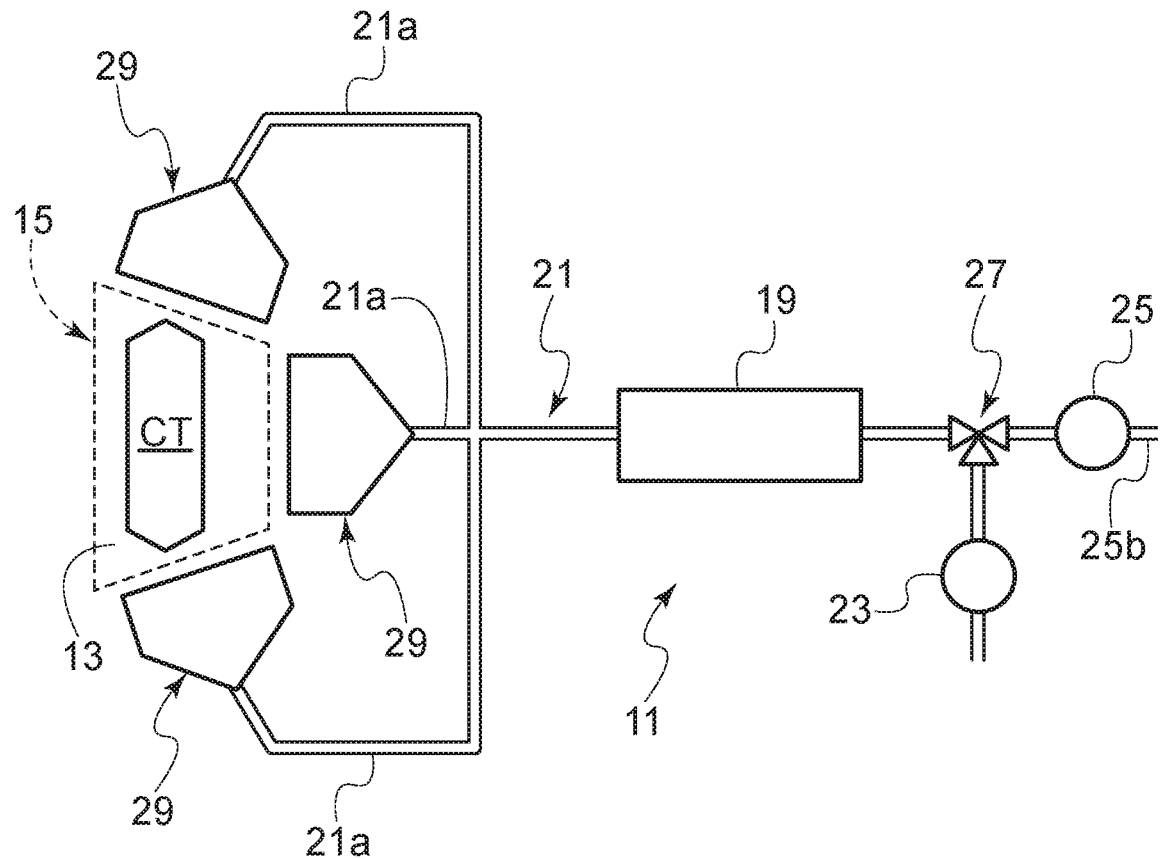

Referring to FIG. 1B, in a particular embodiment of the invention, diffusers 29 communicate with a single sensor 19 through respective segments 21a of duct 21 arranged in parallel.

Figure 1C:
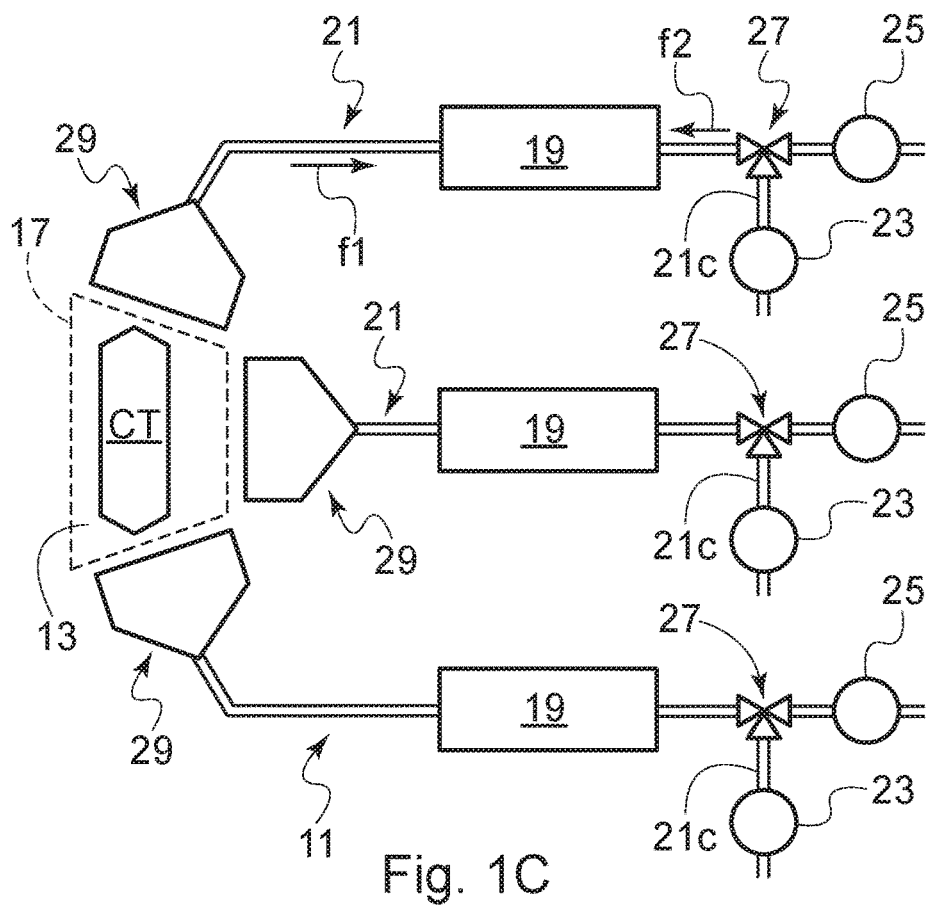

Referring to FIG. 1C, in another embodiment, a plurality of diffusers 29 are provided, each belonging to an independent and separate detection system equipped with respective sensor 19, blower 23, suction fan 25 and valve 27.

Figure 1D:
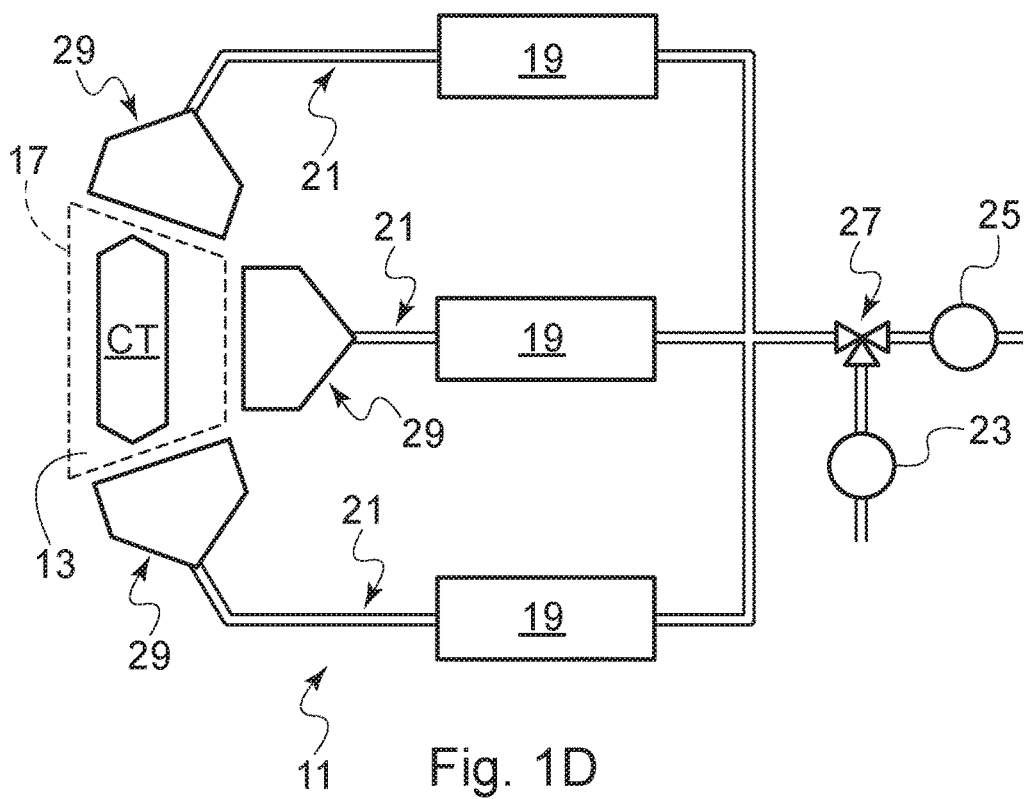

Referring to FIG. 1D, in yet another embodiment of the invention, a configuration intermediate between the ones previously described is provided, in which each diffuser 29 is equipped with a dedicated sensor 19 and each sensor 19 communicates, through a respective segment 21b of duct 21, with a single valve 27 associated with a single blower 23 and a single suction fan 25.

Always according to the invention other embodiments could be envisaged, for instance resulting from the combination of the arrangements described above.

Moreover, each diffuser 29 can preferably be configured and oriented so as to fit the geometries of zone 13 and containers CT to be checked passing in zone 13.

Preferably, the controlled environment from which blower 23 sucks gases contains a mixture of specific gases, for instance a gas different from the tracer gas present in the containers to be checked, or a gas mixture in which the concentration of the gas of the kind present in the containers to be checked is lower than the concentration of the same gas in the containers.

Turning back to FIGS. 1A to 1D, embodiments of the invention are shown where a blower 23 and a suction fan 25 are provided for each duct 21. Blower 23 has an outlet port 23a communicating with duct 21 through segment 21c of duct 21, and suction fan 25 has an inlet or suction port 25a communicating with duct 21 through segment 21d of the same duct 21. Three-way valve 27 is further provided to put in communication duct 21 with suction fan 25 during a suction step and duct 21 with blower 23 during a flushing step. The same three-way valve 27 closes the communication between duct 21 and blower 23 during the suction step, and the communication between duct 21 and suction fan 25 during the flushing step. Thus, according to this embodiment of the invention, air suction from detection zone 13 and flushing are performed by means of two separate and independent units 23, 25, which are put in exclusive communication with duct 21 and detection zone 13 through three-way valve 27.

Figure 1E:
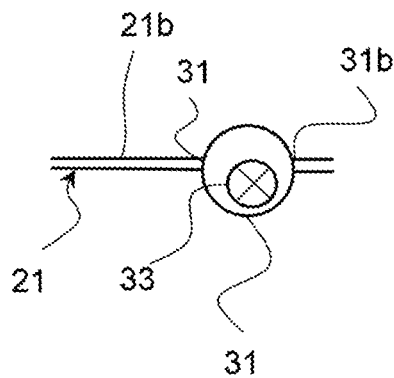

Referring to FIG. 1E, there is schematically and partly shown an alternative embodiment of apparatus 11 according to the invention, in which the air suction from detection zone 13 and the flushing step are performed by means of a single unit 31 that acts therefore both as a suction fan and as a flushing gas blower. Unit 31 incorporates a valve 33 arranged to put duct 21 communicating with detection zone 13 in communication alternatively with inlet/outlet port 31a or with outlet/inlet port 31b of unit 31. Said unit 31 can for instance consist of a reversible blowing unit or compressor. Moreover, during the suction step, the single unit 31 exhausts the gas sucked to the outside environment, whereas in the flushing step it takes the flushing gas from a controlled environment containing the flushing gas.

Figure 1F:
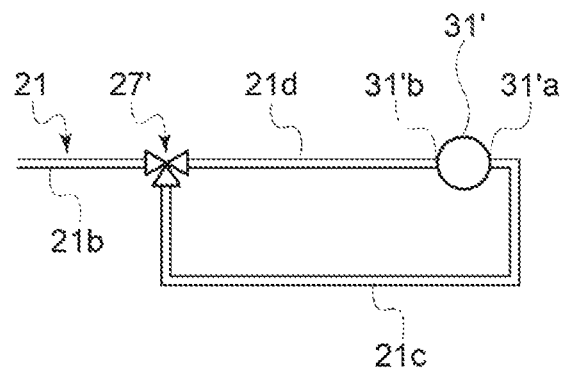

Referring to FIG. 1F, there is schematically and partly shown another alternative embodiment of apparatus 11 according to the invention, in which air suction from detection zone 13 and the flushing step are performed by means of a single unit 31' that acts therefore both as a suction fan and as a flushing gas blower. Unit 31' communicates with a valve 27', preferably a five-way valve, arranged to put in communication:

segment 21b of duct 21 with inlet port 31'a of unit 31', and outlet port 31'b of unit 31' with the outside environment (in the step of air suction from detection zone 13), or, in the alternative segment 21b of duct 21 with outlet port 31'b of unit 31', and inlet port 31'a of unit 31' with a controlled environment containing the flushing gas (in the flushing step).

In a further embodiment of the invention, air suction from detection zone 13 and flushing are performed by means of a single reversible unit, capable of operating either as a suction fan or as a blower by reversing the direction of its operating motion.

Referring to FIGS. 2A to 2D, according to the embodiment of the invention illustrated, a sample container to be tested is placed in detection zone 13, defined in apparatus 11, by means of a positioning assembly 51. According to this embodiment, positioning assembly 51 includes a pair of conveyor belts 53, 55 for the introduction or entrance of the container into detection zone 13 and for the extraction or exit of said container from detection zone 13, respectively. Preferably, said positioning assembly 51 further includes a pair of side guides 55a, 55b for correctly positioning the container in detection zone 13, preferably centrally of zone 13.

Always with reference to this embodiment, a squeezing assembly 57 is further provided in detection zone 13, and it includes a pair of rotatable rollers 59a, 59b arranged transversely to advance direction "d" of conveyor belts 53, 55 and having rotation axes "S1" substantially parallel to the plane defined by said belts 53, 55 on which the sample container to be tested is placed. Each roller 59a, 59b is suspended to a pair of floating arms 61, connected each to a respective pneumatic cylinder 63 capable of applying onto arms 61, and hence onto rollers 59a, 59b, the pressure suitable for causing a squeezing of the container located in detection zone 13, and capable of promoting gas leakage from the inside of the container towards the surrounding environment in zone 13 if an opening is present in said container.

A motor 65 for causing rotation of rollers 59a, 59b through a drive belt 67 is provided in correspondence of pivotal axis "S2" of each arm 61. The positions of pivotal axes "S2" of arms 61 are fixed with respect to structure 15 of apparatus 11, whereas the positions of axes of rotation "S1" of rollers 59a, 59b can change depending on the pressure applied by pneumatic cylinders 63 while a container is passing in detection zone 13. The assembly described, comprising an arm 61, the corresponding pneumatic cylinder 63 and roller 59a, 59b associated with said arm of squeezing assembly 57 described, defines in the whole a third class lever. An angular potentiometer 69, capable of generating an electrical signal indicative of the angular position of the associated arm 61, and consequently, of the position of rollers 59a, 59b relative to the sample container present at that moment in detection zone 13, is provided in correspondence of pivotal axis "S2" of each arm 61 onto frame 17 of stationary structure 15 of apparatus 11. Said angular displacement is indicative of the presence of the sample container to be checked in zone 13. The angular displacement of arm 61 and the associated roller 59a, 59b indicates that a sample is present in zone 13 and that the sample has been partly deformed by squeezing assembly 57. Should a sample not be squeezed, for instance a container arriving already very flat, for instance because it has undergone important leaks and hence it is limp or deflated, the same sample would be discarded.

A plurality of diffusers 29a, 29b, 29c, 29d, each including a respective suction head 71a, 71b, 71c, 71d equipped with a plurality of slots 73 for gas suction are located in detection zone 13. Slots 73 are generally arranged along a peripheral band substantially surrounding the sample container while it is moving in detection zone 13. Moreover, the peripheral band is arranged on a plane "P1" substantially perpendicular to advance direction "d" of the sample on belts 53, 55. Slots 73 are generally arranged along an upper face, a pair of side faces and a bottom face of said peripheral band. Two slots 73 are located on the upper face and belong to upper diffusion head 71a; four slots 73 are located on the bottom face and belong to bottom diffusion head 71d; and one slot 73 is located on each side face, totalling two side slots 73 that belong to side diffusion heads 71b and 71c, respectively. Moreover, each slot 73 communicates with a respective duct formed in the corresponding head provided with the slot, which duct in turn communicates through a port 75 with a gas sensor 19. According to the arrangement described and relating to this specific embodiment of the invention, each slot 73 along the peripheral band is associated with a respective port 75. Ports 75 can be connected to as many sensors 19, or to a single sensor 19, in accordance with one of the embodiments described above in connection with FIGS. 1A to 1D, Detection zone 13 is further equipped with ancillary diffusers 77, through which an air curtain or blade is blown, contributing to isolate detection zone 13 from contamination by gases coming from the surrounding environment.

Figure 3A:
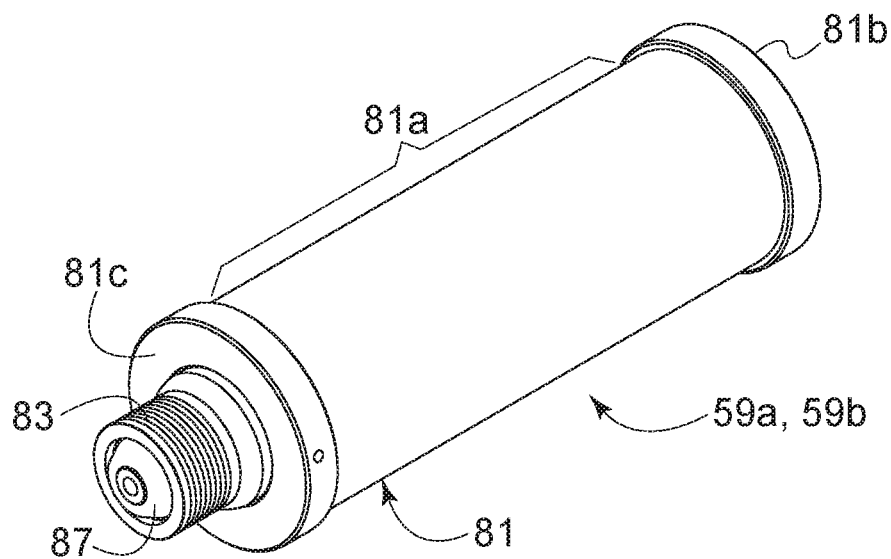
FIG. 3A is a perspective view of a squeezing roller according to a first embodiment.
Figure 3B:
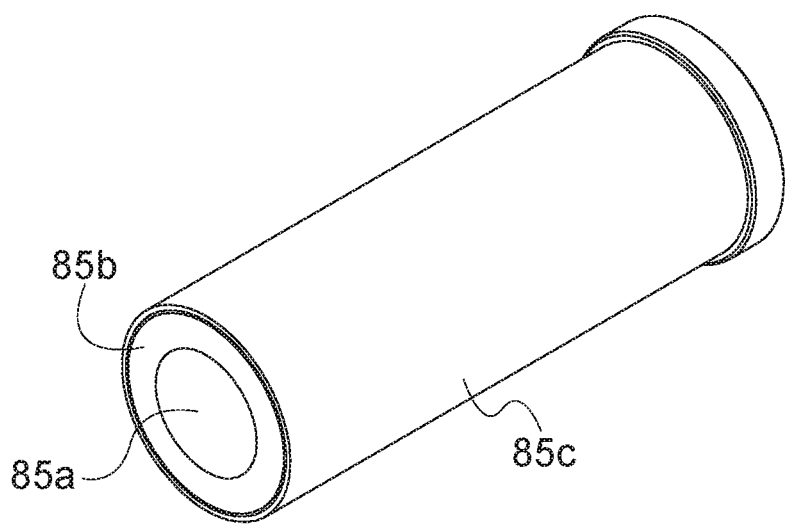
FIG. 3B is a perspective view of the squeezing roller shown in FIG. 3A, from which an end plate has been removed.

Referring to FIGS. 3A and 3B, rollers 59a, 59b of squeezing assembly 57 include a cylindrical body 81 where a central portion 81a bounded by a pair of side end plates 81b, 81c is defined. A grooved pulley 83 is provided externally of one of such end plates for being engaged by belt 67 transmitting the motion imparted by motor 65 located in correspondence of pivotal axis "S2" of one of floating arms 61 to which the corresponding roller 59a, 59b is suspended.

Central portion 81a of roller 59a, 59b includes, when viewed in cross section and starting from the inside and radially going outwards, a substantially rigid and hollow inner central sleeve 85a, for instance made of steel or aluminium, an intermediate soft layer 85b, for instance made of foam rubber, and an external coating 85c of an antislip material, i.e. with high grip, for instance natural rubber, capable of exerting a strong friction against the surface of the passing sample container, in order to make it advance without slipping while being squeezed in detection zone 13. A shaft 87, the ends of which are integral with side end plates 81b, 81c and external pulley 83, is provided inside central sleeve 85a.

Figure 4:
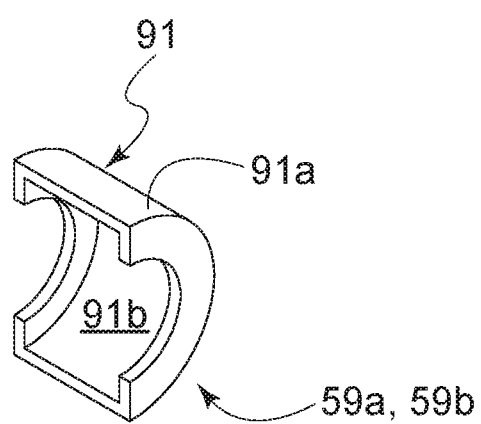
FIG. 4 is a cross-sectional perspective view of a squeezing roller according to a variant embodiment.

In the alternative, referring to FIG. 4, rollers 59a, 59b of squeezing assembly 57 include a hollow rubber sleeve 91, outer surface 91a of which has antislip properties thanks to the nature of the material of the sleeve, and internal cavity 91b of which determines a certain softness and capability of compression of sleeve 91 by external radial thrusts, due to the resistance to squeezing the sample container opposes while passing under rollers 59a, 59b.

Turning back to FIGS. 2A to 2D, taking into account that detection zone 13 includes a peripheral band of suction slots 73 surrounding the sample container while it is passing in detection zone 13, the need arises to interrupt the conveyor belt. Said conveyor belt 53, 55 thus includes an input section 53, advancing in a direction towards detection zone 13 to place the sample into said zone 13 and make it pass internally of the band of slots 73, and an output section 55, advancing in a direction away from detection zone 13, to move the sample out of said zone 13 towards a destination downstream of zone 13 in a container processing plant. Said destination can be either a preferential destination of inclusion of the container in a packaging plant, or an exclusion destination, in which the container having exhibited defects in the hermetic sealing is discarded. Slots 73 in the bottom face of the peripheral band, belonging to bottom diffusion head 71d, are located at the conveyor belt interruption, between the end of input section 53 and the beginning of output section 55. Said sections 53, 55 therefore will be mutually spaced apart, in the longitudinal direction of belt advance, by a distance sufficient to allow air suction by bottom diffusion head 71d, yet without jeopardising the smooth transfer of the sample container, i.e. in such a manner that such interruption cannot cause jamming or changes of direction on the sample.

Slots 73 located on the upper face and along the side faces of the peripheral band are adjustable in height to cope with the presence of sample containers with different sizes in detection zone 13.

Slots 73 belonging to upper head 71a, which therefore are located along the upper face of the peripheral band, are obliquely arranged relative to the plane of the band and are inclined by an angle ranging from about 15° to 30° relative to said plane. Slots 73 belonging to side heads 71b, 71c, which therefore are located along the side faces of the peripheral band, are arranged substantially perpendicular to the plane of the band and parallel to advance direction "d" of the samples. Slots 73 belonging to bottom head 71d, which therefore are located along the bottom face of the peripheral band, are parallel to the plane of the band and perpendicular to advance direction "d" of the samples.

Figure 5A:
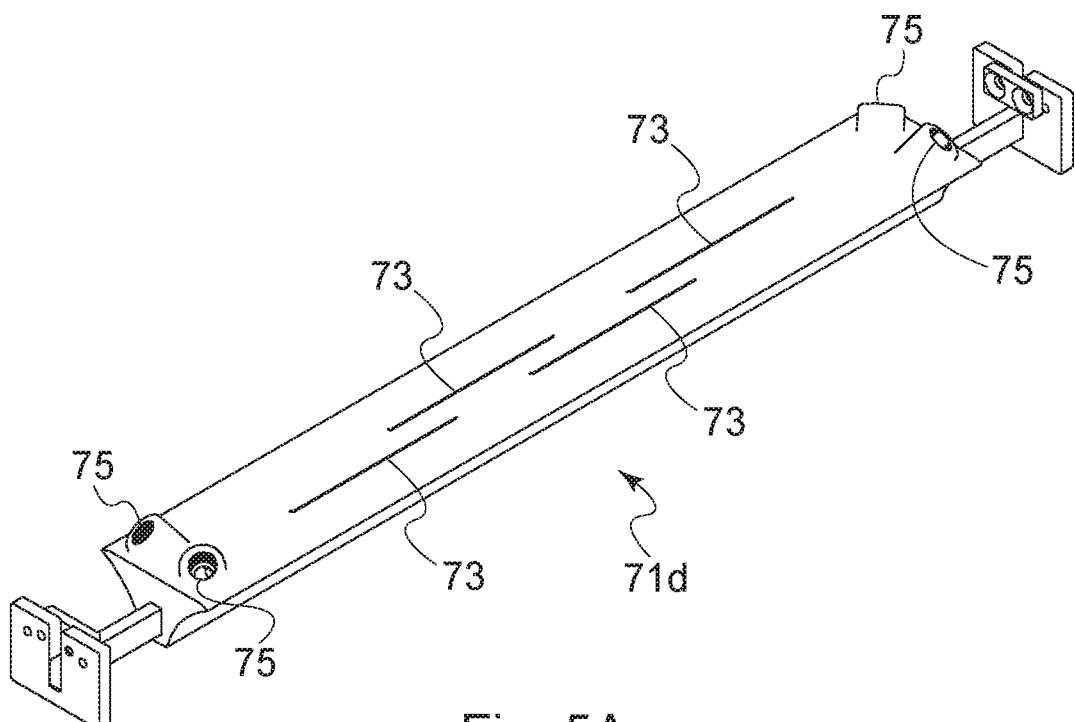
FIG. 5A is a top perspective view of a first diffuser.
Figure 5B:
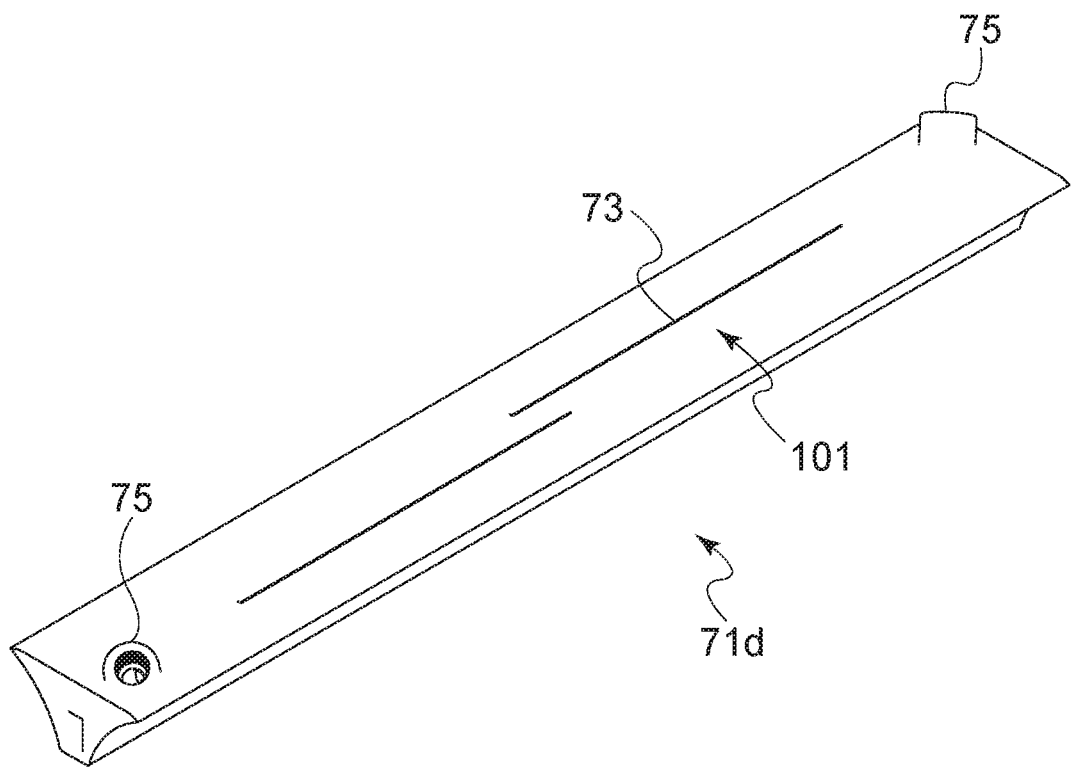
FIG. 5B is a view in transparency of the diffuser shown in FIG. 5A.

As it can be better appreciated from FIGS. 5A and 5B, bottom slots 73 are defined in a suction head or assembly 71d with four channels, one for each slot 73. Bottom suction assembly 71d has an elongated body with substantially trapezoidal cross-sectional shape. Four separate cavities 101, putting a corresponding slot 73 in communication with a respective gas outlet port 75, are defined inside the elongated body. Four slots 73 in the whole are provided in bottom suction head 71d, and they have a length shorter than that of the elongated body and are arranged on two parallel lines, a pair of slots in each line. Moreover, slots 73 are so offset as to ensure suction continuity over the whole length of the elongated body of head 71d. Internal cavities 101 of the elongated body, defining the suction ducts for conveying the fluid sucked through slots 73 towards the respective outlet ports 75, are configured so as to avoid sharp angles and to promote a laminar flow of the fluid flowing therethrough.

Figure 6A:
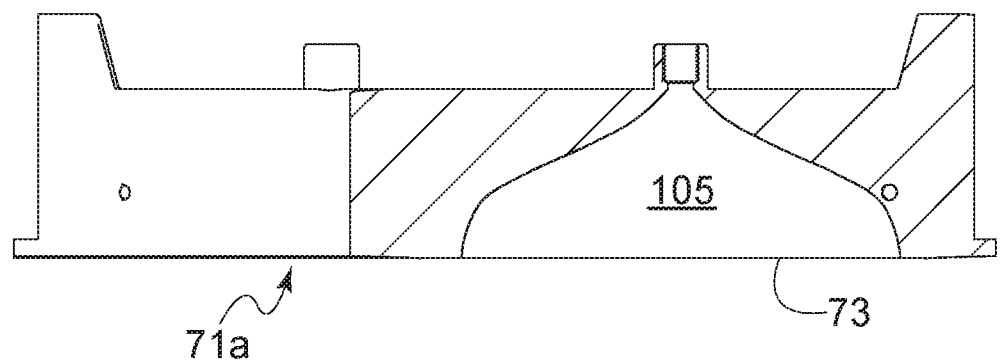
FIG. 6A is a side plan view of a second diffuser.
Figure 6B:
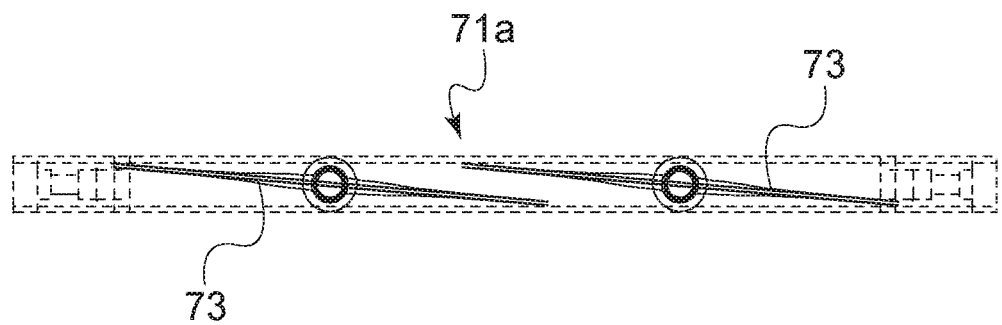
FIG. 6B is a bottom plan view of the diffuser shown in FIG. 6A.
Figure 6C:
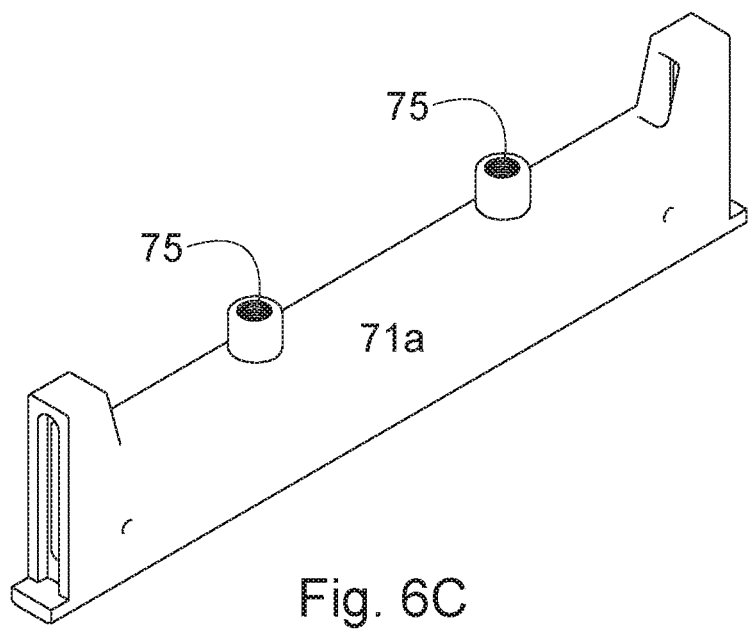
FIG. 6C is a view in transparency of the diffuser shown in FIG. 6A.

Referring to FIGS. 6A to 6C, slots 73 located on the upper face of the peripheral band are defined in an upper head 71a, or upper suction assembly, with two channels, one for each slot 73. Upper suction assembly 71a has an elongated body with approximately parallelepiped shape. Two cavities 105, putting a corresponding slot 73 in communication with a respective gas outlet port 75, are defined inside the body. Two slots 73 are provided in the whole, and they have a length shorter than that of the elongated body of head 71a and are obliquely arranged so that there is an overlap of the projections of the slots on a plane perpendicular to advance direction "d" of the sample, so as to ensure suction continuity over the whole width of the elongated body of upper head 71a. Internal cavities 105 of the elongated body, defining the suction ducts for conveying the fluid sucked through slots 73 towards the respective outlet ports 75, are configured so as to avoid sharp angles and to promote a laminar flow of the fluid flowing therethrough.

Figure 7A:
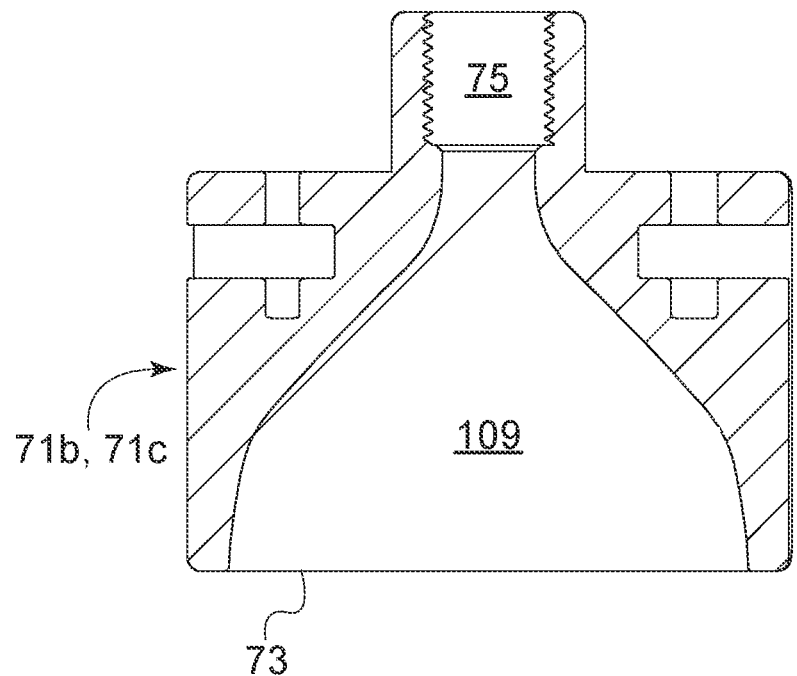
FIG. 7A is a plan side view of a third diffuser.
Figure 7B:
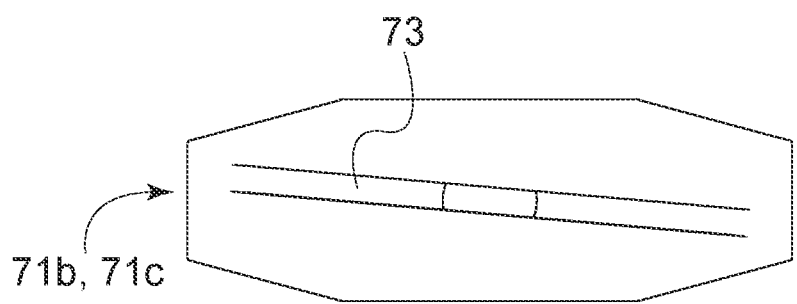
FIG. 7B is a bottom plan view of the diffuser shown in FIG. 7A.

Referring to FIGS. 7A and 7B, slots 73 located on each side face are defined in a respective side head 71b, 71c or side suction assembly with one channel, one assembly for each side face. Side suction assembly 71b, 71c has a prismatic body with approximately parallelepiped shape. A cavity 109 putting a corresponding slot 73 in communication with a respective gas outlet port 75 is defined inside the body. There is a single cavity 73 in each side head 71b, 71c, and it has about the same length as the corresponding suction body and is arranged approximately parallel to advance direction "d" of the sample. Internal cavity 109 of the elongated body, defining the suction ducts for conveying the fluid sucked through slot 73 towards the respective outlet port 75, is configured so as to avoid sharp angles and to promote a laminar flow of the fluid flowing therethrough.

Turning back to FIG. 1A, a preferred embodiment of the method for detecting leakages from sealed containers according to the invention will be described hereinafter.

The method mainly includes a step in which a container the tightness of which is to be checked is placed in detection zone 13 and a step in which air present in said detection zone 13 is sucked through at least one suction duct 21 communicating with said detection zone 13. According to the invention, the suction step is preceded by a step in which duct 21 and detection zone 13 are flushed, this step being performed by reversing the flow passing through the same duct 21.

According to a first aspect, the invention includes preferably defining in detection zone 13 a predetermined gas atmosphere, substantially free from turbulences, in which the tracer gas of the kind enclosed in the container is present in a constant concentration. Advantageously, the shape and the arrangement of diffusers 29 described hereinbefore allow attaining the desired result as far as the absence of turbulences in zone 13 is concerned. According to such a first aspect, the invention allows detecting gas micro-leaks from containers when the tracer gas concentration inside the container is different from that in the surrounding environment.

Moreover, the invention also optionally provides for the possibility of modifying, by means of the flushing step, the composition of the gas mixture in the vicinity of the container in detection zone 13, thereby modifying the concentration of the gas corresponding to the tracer gas enclosed in the sealed container. Thus, the invention allows detecting gas micro-leaks from containers when, before the modification carried out during the flushing step, the gas composition is substantially the same as that in the surrounding environment.

Referring by way of example to $CO_2$ as tracer gas introduced into the container before sealing it, the invention provides, in accordance with the first aspect described, for a presence of $CO_2$ inside the container in a concentration exceeding the atmospheric one (typically 400 ppm) and, in accordance with the second aspect described, for substantially the same concentration of $CO_2$ as the atmospheric one. In the second case, as stated before, the invention provides for defining a modified atmosphere in detection zone 13 by means of the flushing step, i.e. an atmosphere with a reduced concentration of $CO_2$, or free from $CO_2$. This second aspect of the invention can be achieved for instance by introducing a pure gas such as nitrogen into the detection zone.

In a preferred embodiment of the invention, the suction step and the flushing step are performed by means of suction fan 25 having suction port 25a communicating with duct 21 and by means of blower 23 having outlet port 23a communicating with the same duct 21, respectively. A three-way valve 27 is further provided in order to put in communication duct 21 with suction fan 25 during the suction step, and duct 21 with blower 23 during the flushing step. The same three-way valve 27 closes the communication between duct 21 and blower 23 during the suction step, and the communication between duct 21 and suction fan 25 during the flushing step.

According to the invention, gas sensor 19 is provided along suction and flushing duct 21, between detection zone 13 and suction unit 25 or blower 23, and is arranged to generate an electrical signal indicative of the presence of a given gas in the air flow that flows in duct 21 coming from detection zone and licks said sensor 19. Advantageously, arranging gas sensor 19 adjacent to detection zone 13 allows increasing the measurement sensitivity of the gas sensor. Actually, gas sucked from detection zone 13 by means of suction unit 25 directly arrives at gas sensor 19 without previously flowing through suction unit 25, what would cause a homogenisation of the gas to be detected in the gas sample sucked.

Thus, according to the invention, the method for detecting leakages mainly and preferably includes the steps of:
 defining a detection zone 13 in which a sealed container will be placed;
 putting said detection zone 13 in communication with a gas sensor 19 through a duct 21;
 introducing a flushing gas or gas mixture into detection zone 13, by making the flushing gas or gas mixture flow through said duct 21 in a first direction;
 placing a container in said detection zone 13;
 sucking a gas sample from said detection zone 13 and transferring it to sensor 19 for ascertaining the presence of a gas leakage in said container, said gas being transferred from said detection zone 13 to said sensor 19 by making it flow through the same duct 21 in a second direction opposite to said first direction.

Moreover, the suction step is preferably immediately started, i.e. substantially in seamless manner, after stopping the flushing step.

Optionally, the method according to the invention includes a step in which the sample container undergoes a compression or squeezing step, for promoting possible gas spillage. Preferably, said squeezing step is performed by means of squeezing assembly 57 described hereinbefore.

Figure 8:
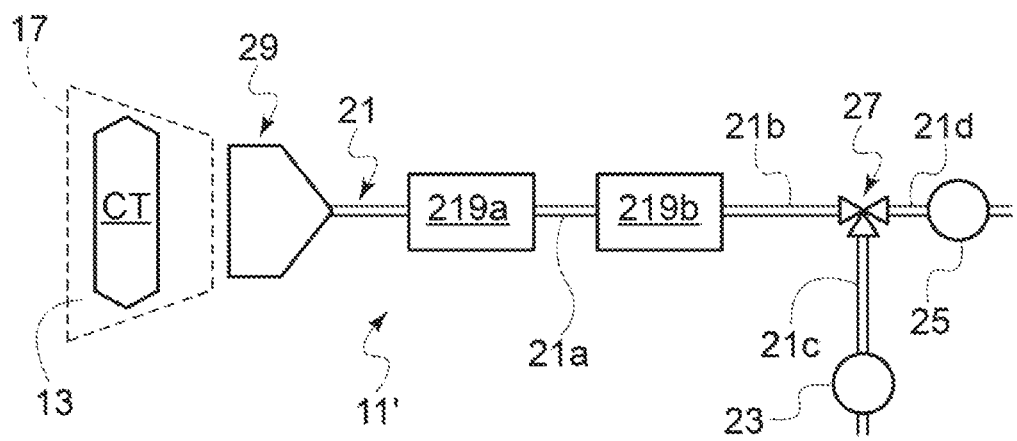
FIG. 8 is a schematic representation of a second embodiment of the apparatus according to the invention.
Figure 2A:
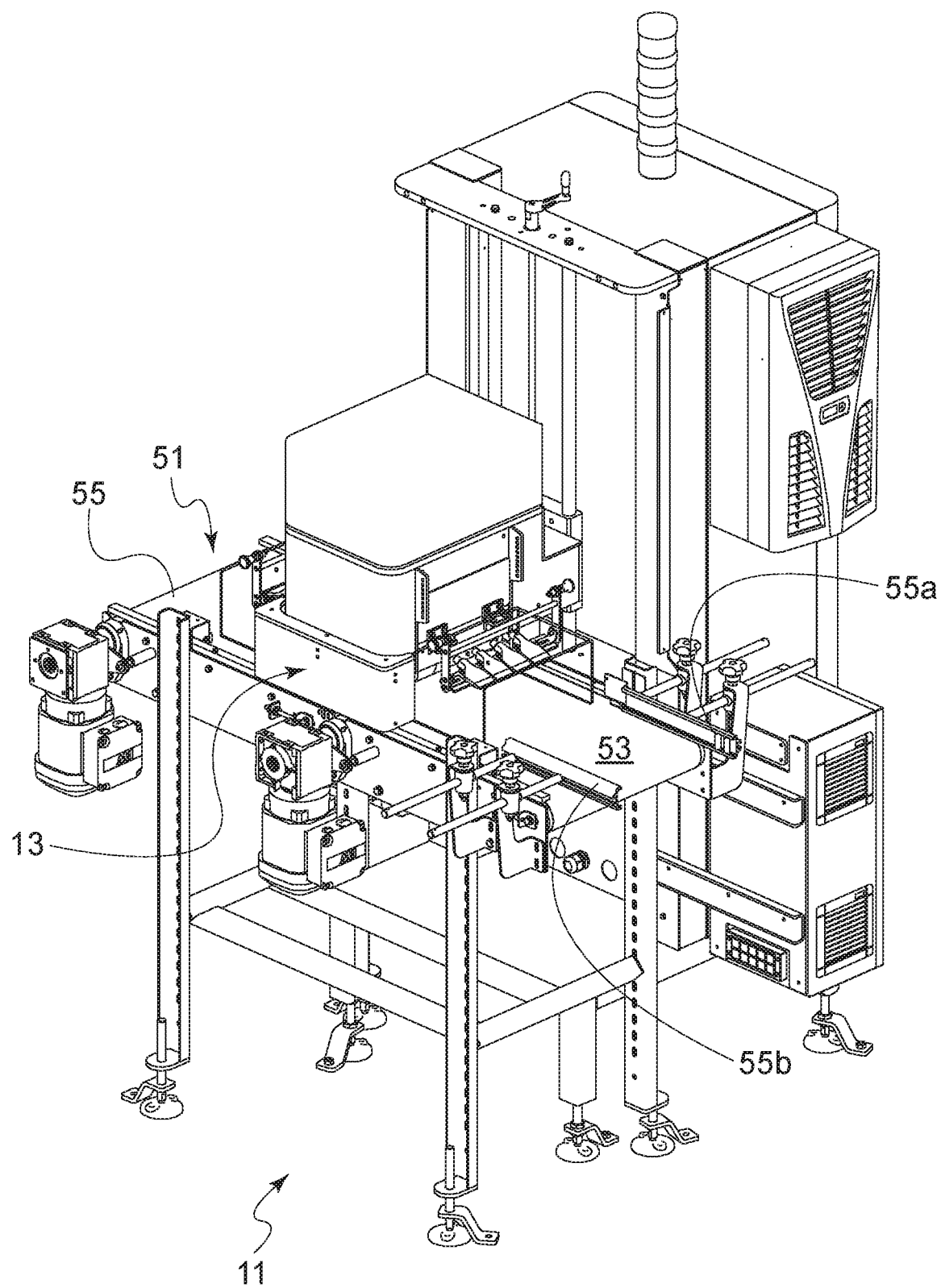
FIG. 2A is a side perspective view of the apparatus according to a preferred embodiment of the invention.
Figure 2B:
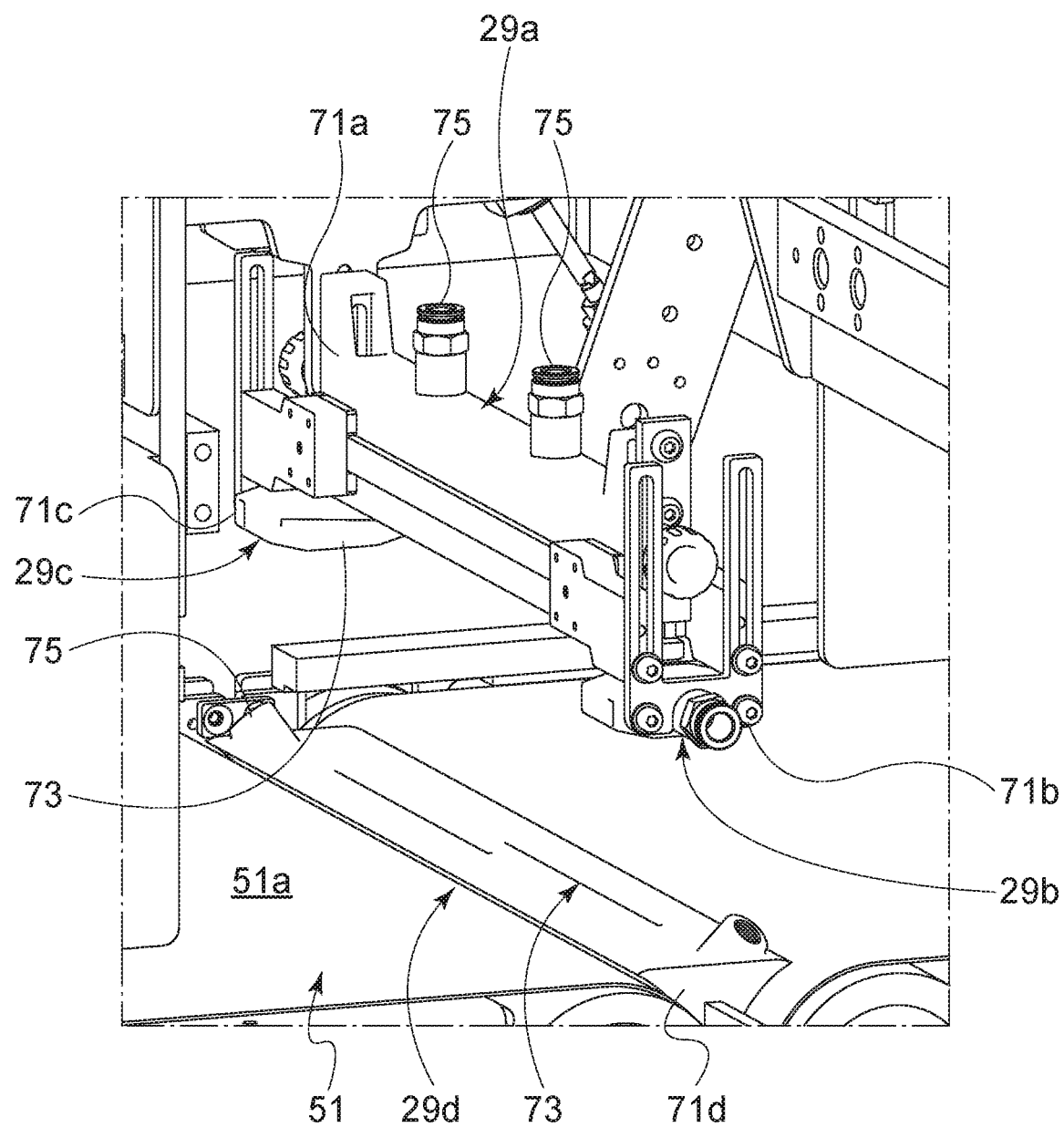
FIG. 2B is a side perspective view of the detection zone of the apparatus shown in FIG. 2A.
Figure 2C:
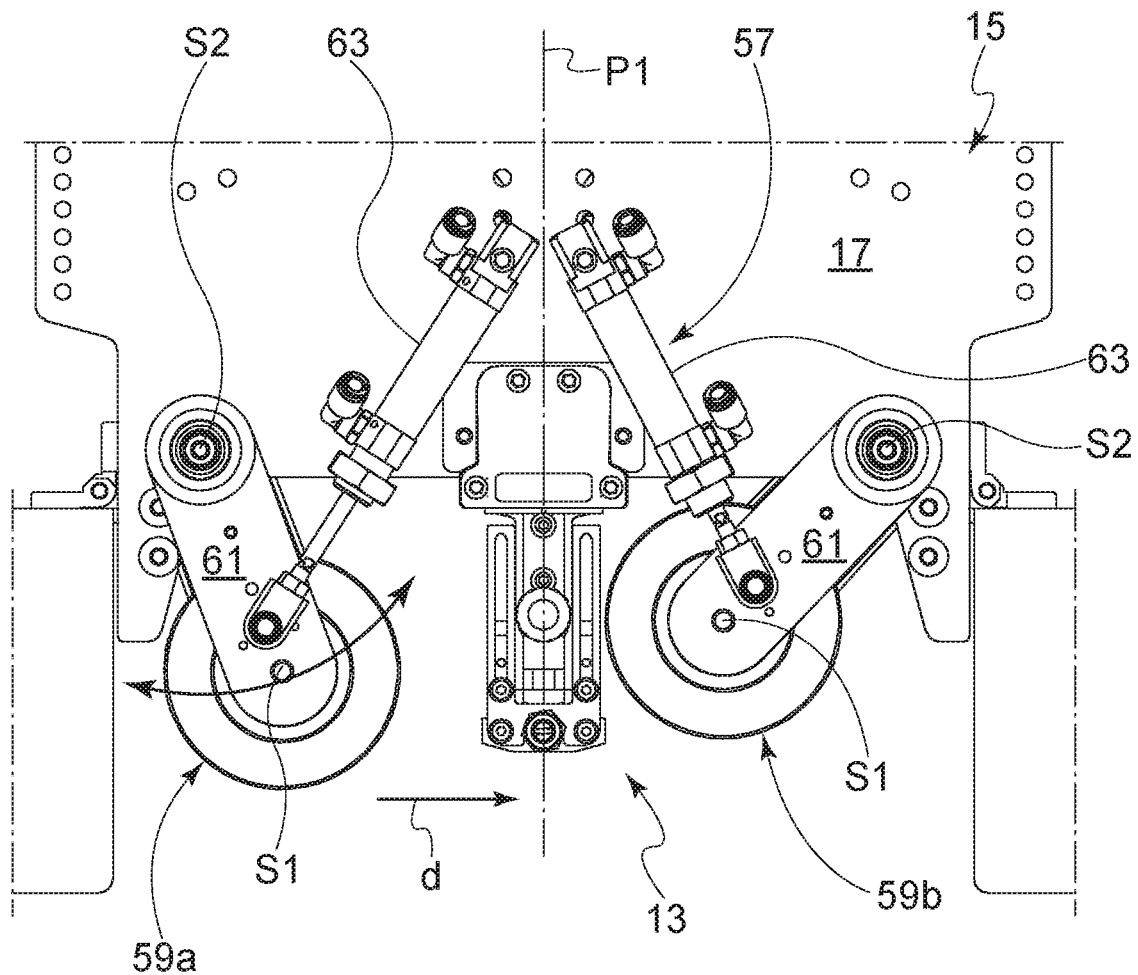
FIG. 2C is a side plan view of the detection zone of the apparatus shown in FIG. 2A.
Figure 2D:
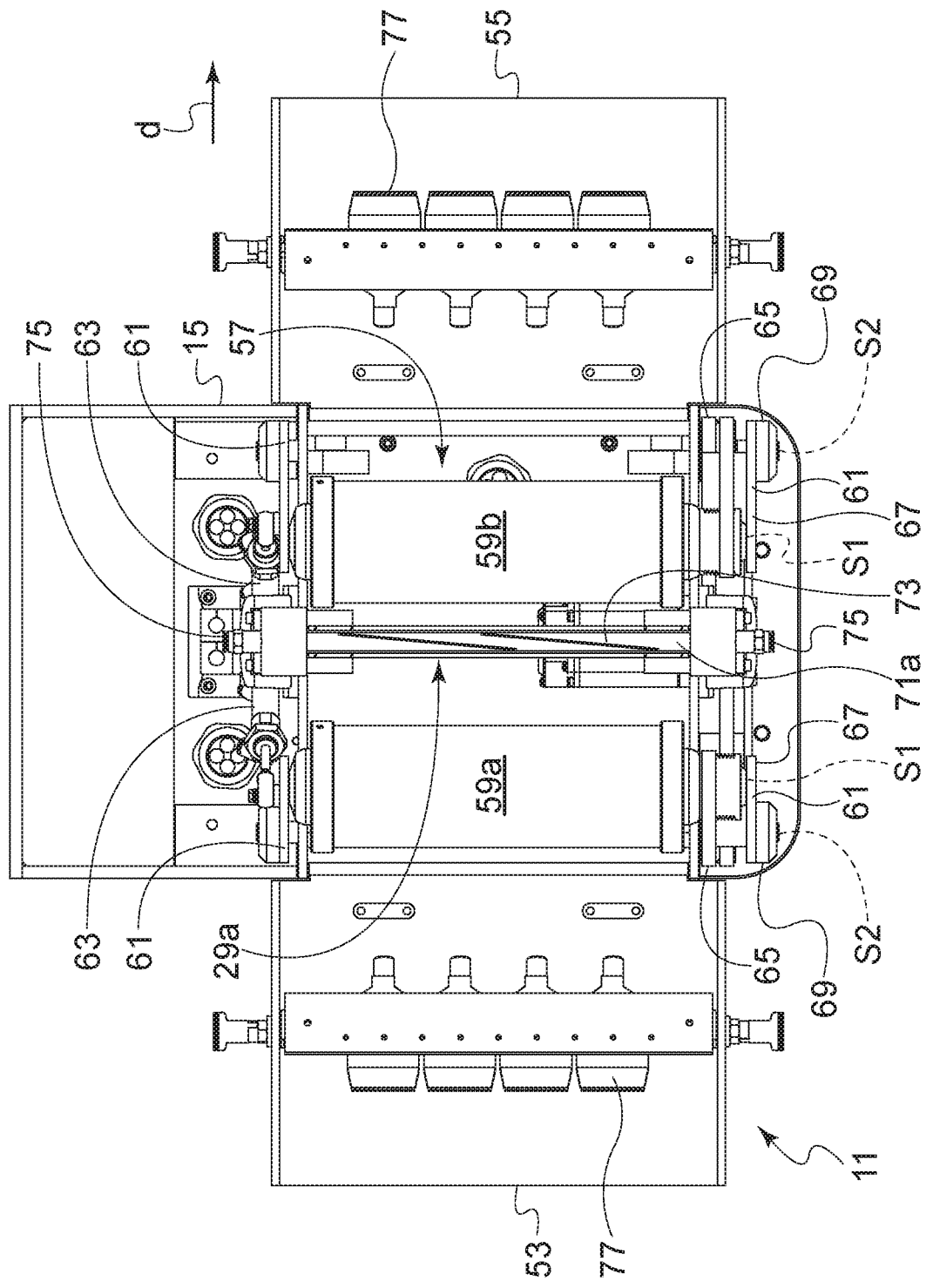
FIG. 2D is a top plan view of the detection zone of the apparatus shown in FIG. 2A.

Reference will now be made to FIG. 8 for describing a preferred embodiment of an apparatus 11' made in accordance with a particular embodiment of the invention and arranged to implement a detection method capable of considerably increasing the sensitivity of the detection itself.

In FIG. 8, reference numerals 219a and 219b denote two gas sensors serially connected in the same duct 21. According to this embodiment of the invention, duct segment 21e connecting the two sensors 219a, 219b causes a delay, relative to the signal generated by sensor 219a located downstream of duct segment 21e, in the signalling by sensor 219b of the presence of a tracer gas mixed with a gas mixture coming from detection zone 13 and flowing in duct 21.

Hereinafter, the operation principle of this variant of the detection method according to the invention will be explained in more detail.

Figure 9A:
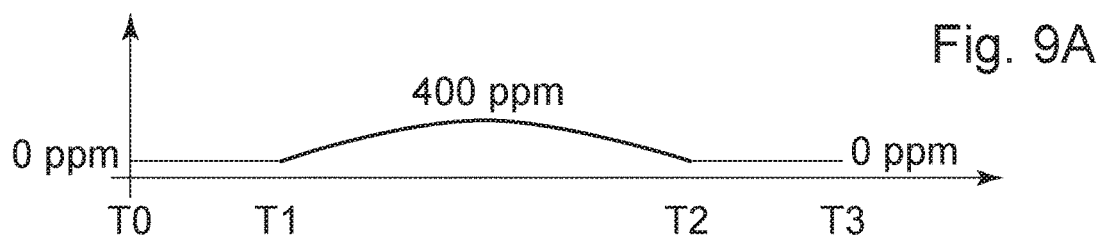
FIGS. 9A to 9E are graphs of as many tracer gas concentration signals.

Referring to FIG. 9A, there is shown the graph, against time, of the variation of the $CO_2$ concentration, measured by means of an indicative signal generated by a $CO_2$ sensor 19 of the kind implemented in the first embodiment of the invention described with reference to FIGS. 1A to 1E. The graph in FIG. 9A relates to an operation cycle of apparatus 11 according to the invention, when no sample to be tested is present or when the sample is perfectly hermetic, i.e. wholly free from leakages.

In accordance with the preferred embodiment of the method according to invention, at time $T_0$ detection zone 13 of an apparatus 11 made in accordance with the invention is reached by a flow of flushing gas coming from blower 23. Said flushing gas can be for instance nitrogen or a gas mixture having a high nitrogen concentration. The flow of flushing gas is introduced into detection zone 13 through diffusers 29. The flow of flushing gas flows through duct 21 in direction of detection zone 13 and licks gas sensor 19, which detects 0 ppm $CO_2$, since nitrogen is substantially the only gas licking the sensor.

At time $T_1$ the flow of flushing gas is stopped and, substantially in seamless manner, the suction step is started to suck air from detection zone 13, always through the same diffusers 29 through which flushing of zone 13 has been performed. Air sucked from detection zone 13 by means of suction fan 25 flows moreover through the same duct 21 through which the flow of flushing gas previously flowed, and it is intercepted by sensor 19, which detects for instance 400 ppm, i.e. the typical atmospheric concentration of $CO_2$.

At time $T_2$ the suction step is stopped and a flushing step starts again in which nitrogen coming from blower 23 is introduced into detection zone 13. Nitrogen flows again through the same duct 21 in opposite direction with respect to air sucked in the previous step and it is intercepted by sensor 19, which detects again 0 ppm $CO_2$, since nitrogen is again the only gas licking said sensor 19. At time $T_3$ the cycle is stopped.

Figure 9B:
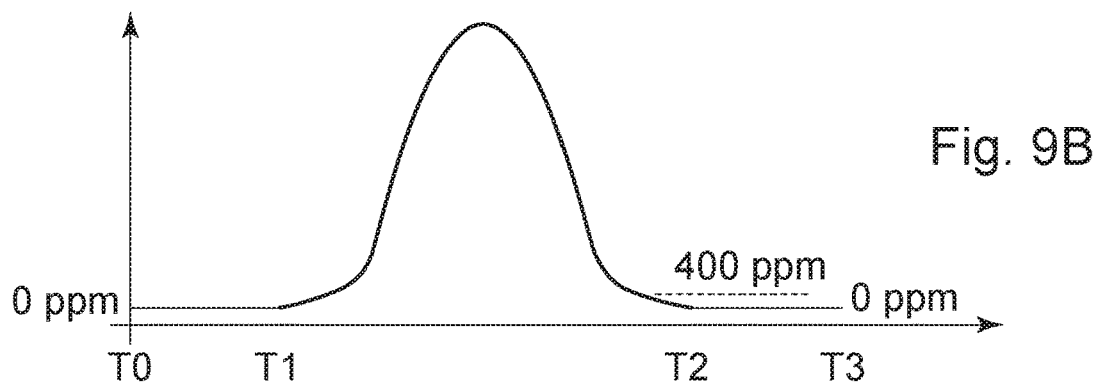

Referring to FIG. 9B, reference is now made to a sample container to be tested passing in detection zone 13 of apparatus 11 containing a tracer gas that is assumed to be $CO_2$.

FIG. 9B shows the graph, against time, of the variation of the $CO_2$ concentration measured by means of an indicative signal generated by $CO_2$ sensor 19. The operation cycle is substantially the same as in the preceding case, yet, at time $T_1$, the sample container to be tested, which has a micro-hole from which $CO_2$ leaks, is made to pass at constant speed in detection zone 13. In the interval between time $T_1$ and time $T_2$, sensor 19 detects a $CO_2$ leak, as it can be appreciated from FIG. 9 B. The $CO_2$ concentration at sensor 19 progressively increases up to a maximum, and then decreases as the passing sample, and consequently the micro-hole, is moving away from detection zone 13. At time $T_2$, when the container being tested has already passed through detection zone 13 and consequently the micro-leak has moved beyond diffusers 29 through which gases have been sucked, suction is stopped and flushing step with introduction of pure nitrogen, i.e. a gas substantially containing 0 ppm $CO_2$, is started again. At time $T_3$ the cycle is stopped.

The operation cycle of apparatus 11 described above with reference to FIGS. 9A and 9B can also be carried out by using compressed air (400 ppm, dashed line in the diagram of FIG. 9B) instead of pure nitrogen (solid line in the graph of FIG. 9B) as flushing gas, or by using other gas mixtures where the $CO_2$ concentration is lower than that due to the micro-leak detected.

Figure 9C:
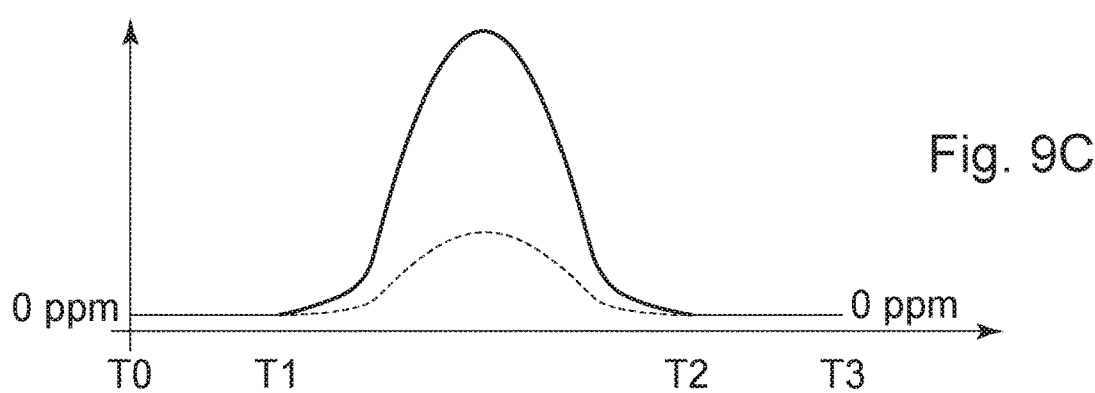

Referring to FIG. 9C, there is shown the graph, against time, of the variation of the $CO_2$ concentration measured at sensor 19 in the case of two passing samples exhibiting gas leaks of different amounts, namely a small amount (dashed line) and a great amount (solid line). As it can be appreciated, the shape of the curve of the signal indicative of the variation of the concentration of tracer gas, $CO_2$ in the example illustrated, is substantially always the same. As it will become even more apparent from the following description, experiments carried out have actually allowed determining that the graphical appearance of the signal indicative of the gas concentration in interval $T_1$-$T_2$ has a Gaussian-like behaviour. What is different obviously is the signal intensity, which depends on the size of the opening causing the leakage, on the tracer gas concentration in the gas mixture spilling from the container and on whether and how much the sample is mechanically stressed by squeezing assembly 57, if any (the stronger the squeezing, the higher the leakage intensity detected by sensor 19).

Figure 9D:
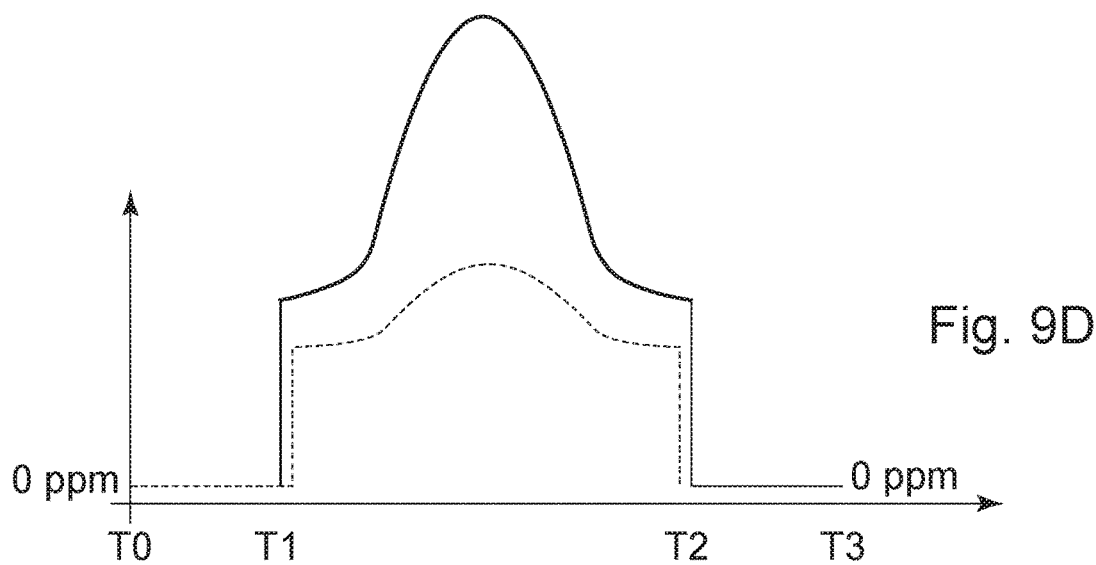
Figure 9E:
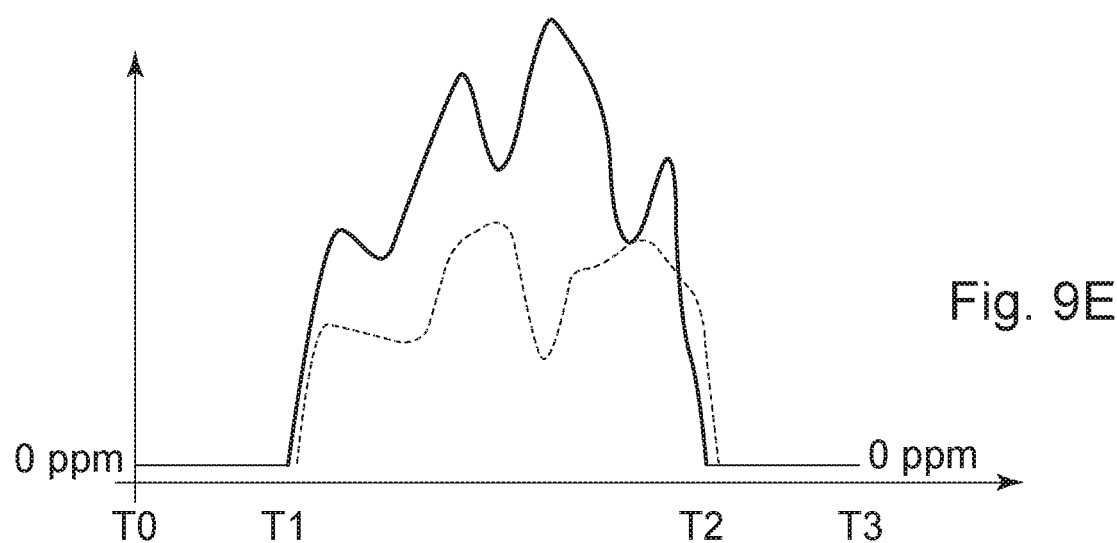

Referring to FIGS. 9D and 9E, there is shown the graph, against time, of the variation of the $CO_2$ concentration in case of samples passing at high speed, when perturbations in the concentration of tracer gas, that is of ambient $CO_2$ in the example illustrated, occur in zone 13 in interval $T_1$-$T_2$.

Referring in particular to FIG. 9D, there is shown the graph, against time, of the variation of the $CO_2$ concentration measured at sensor 19 in case of two passing samples exhibiting gas leaks of different amounts, namely a small amount (dashed line) and a great amount (solid line), when a very high and constant background value of tracer gas, $CO_2$ in the specific case, with variable offset, is present in interval $T_1$-$T_2$.

Referring in particular to FIG. 9E, there is shown the graph, against time, of the variation of the $CO_2$ concentration measured at sensor 19 in case of two passing samples exhibiting gas leaks of different amounts, namely a small amount (dashed line) and a great amount (solid line), when a very high and highly fluctuating background value of tracer gas, $CO_2$ in the specific case, with strong turbulences and variable offsets is present in interval $T_1$-$T_2$.

Figure 10:
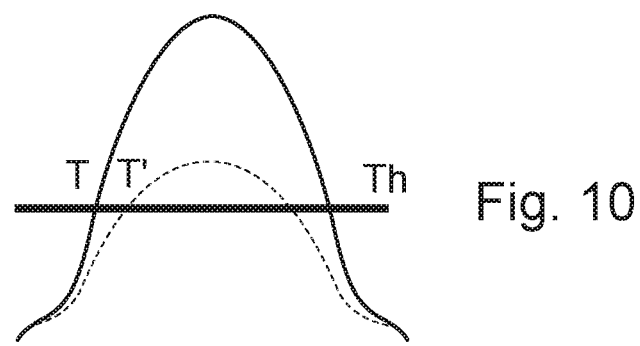
FIG. 10 is a graph comparing two tracer gas concentration signals of different intensities.

As it can be appreciated from FIG. 10, a detection method based on a fixed threshold for the tracer gas concentration has a number of limitations. First, being the threshold fixed, such a detection method is very sensitive to background gas offsets. Second, the instant at which the signal emitted by the sensor and indicative of the tracer gas concentration exceeds the fixed threshold, and consequently causes signalling the occurrence of a leak, varies depending on the tracer gas concentration, that is depending on the leak amount. Always with reference to FIG. 10, where signals indicative of a leak of small amount (dashed line) and great amount (solid line) are shown and the threshold is identified by horizontal solid line Th, the instant at which the occurrence of a leak is signalled actually has a time shift T→T' varying as the tracer gas concentration varies.

Figure 11A:
FIGS. 11A to 11C are graphs of as many gas concentration signals that do not indicate a leakage.
Figure 11B:
Figure 11C:

Such an approach in which a threshold fixed relative to the signal generated by a gas sensor is set is moreover scarcely performant in case of micro-leaks of very small amounts, and moreover gives rise to the problem of false positives, i.e. false signallings of leak occurrence. More specifically, referring to FIG. 11A, an example is shown in which a small variation in the tracer gas concentration at the gas sensor, due to a micro-opening in the container, would not be sufficient to allow recognising that the container is not correctly sealed and hence is possibly to be discarded. FIG. 11B shows an example in which a fluctuation in the concentration of a gas of the same kind as the tracer gas introduced in the container, due to causes external to the container, has been misinterpreted as a leak since it is sufficient to generate, at the gas sensor, a signal whose value exceeds the fixed threshold set. FIG. 11C shows an example similar to the previous one, in which background gas turbulences, due to causes external to the container, have been misinterpreted as a leak.

Too low a fixed threshold would therefore make practically impossible distinguish the transitions due to micro-leaks from the ones due to background noise, which are the majority. The presence of the background noise compels therefore to set the threshold to a value significantly different from zero and, anyway, with an absolute value higher than the noise "peaks". In the specific case this means therefore that a leak would be detected only if its amount is much greater than the background fluctuations.

The detection method according to the alternative embodiment of the invention, capable of considerably increasing the sensitivity of the detection itself, exploits a principle allowing precisely establishing the instant, i.e. the timing, at which a leak has occurred. Establishing a precise and repeatable timing at which a leak occurrence is signalled allows considerably narrowing the interval of analysis of the measurement on the moving sample near the passage of the sample container affected by the leak to be detected. The precise timing selection makes the detection method less sensitive to ambient turbulences that can originate signals that are very similar to the signal characteristic of a leak and could therefore misinterpreted as leak-indicative signals.

As stated before with reference to FIG. 10, by assuming a fixed threshold Th exceeding of which triggers signalling the presence of tracer gas, as the amplitude of the signal indicative of the presence of gas originated by a leak varies, also the delays of instants T, T' at which the leak is signalled due to the threshold being exceeded vary. More particularly, such delays increase as the signal amplitude decreases. Assuming that the signal generated by sensor 19 is sent to a comparator device arranged to generate a logical signal "0" when the intensity of the input signal of the comparator is below the threshold value set, and a logical signal "1" when the intensity of the input signal of the comparator exceeds the threshold value set, the time intervals between the transitions from logical state "0" to "1", due to the delays pointed out above, do not correspond to the correct time intervals at which the variation of the tracer gas concentration at the sensor has occurred. This effect of the timing dependence on the signal amplitude is referred to as "walk" effect in the scientific literature and, as pointed out above, a timing technique based on a fixed threshold is affected by a significant "walk" effect.

Moreover, the signals generated by the gas sensor are generally affected by a significant background noise, which causes an equally significant "jitter" effect, i.e. a fluctuation, in the timing.

The substantial similarity in the shapes of the curves of the signal indicative of the tracer gas concentration in the gas mixture arriving at the sensor, notwithstanding the variation in the signal amplitude, has advantageously enabled adoption of a substantially walk-free timing technique, consisting in making the transition of the timing logical signal occur when the signal exceeds a threshold that ideally, for each signal, adapts itself to a defined fraction of the maximum of the curve, for instance when the signals attain half their final amplitude.

Providing such a "floating" threshold is comparable to a so called "Constant Fraction Timing" or "Constant Fraction Discrimination" (CFD).

Reference will now be made again to FIG. 8 for describing a preferred embodiment of an apparatus 11' made in accordance with a particular embodiment of the invention, arranged to implement the detection method capable of considerably increasing the sensitivity of the detection itself.

As disclosed hereinbefore, apparatus 11' includes a pair of sensors 219a and 219b connected to each other by duct segment 21e the internal volume of which is known: i.e. the length and the cross-sectional size of said duct segment 21e are known and constant. Such a duct 21e separating sensors 219a and 219b substantially forms a corresponding delay line in gas propagation along duct 21.

Figure 12:
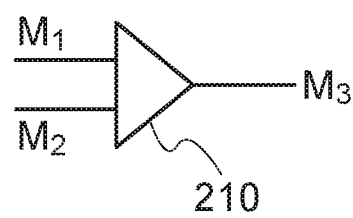
FIG. 12 is a diagram of the comparison circuit of the second embodiment of the invention.

Referring also to FIG. 12, corresponding signals $M_1$ and $M_2$ coming from the two sensors 219a and 219b are sent to a comparator 210 and output signal $M_3$ of comparator 10 will indicate the occurrence of a leak from a passing container when the signal of the second sensor 219b exceeds the floating threshold determined by the variable signal of the first sensor at the same time instant.

This technique advantageously allows having a discrimination time instant independent of the amplitude and less sensitive to jitter and walk.

CFD discrimination moreover makes the system more performant in case of low intensity leak signals and increases measurement sensitivity. Furthermore, the detection method is less affected by background variations, or turbulence effects, of external $CO_2$. This detection technique moreover allows preventing false positives, i.e. preventing external fluctuations from being misinterpreted as leak measurements.

Figure 13:
FIG. 13 is a graph of a pair of gas concentration signals generated by a pair of sensors in the second embodiment of the invention.

In the example shown in FIG. 13 two switches, i.e. two transitions, 0→1 of the comparator occur in the proper measurement interval, yet such switches occur at time instants different from the instant at which reading is made. If the switches occur at too close instants, they are considered by the system as being due to background noise and not to events determined by a leak of $CO_2$.

In an alternative embodiment of the apparatus made in accordance with this particular embodiment of the invention, the signal of the second sensor is replaced by a second signal of a first sensor, in which the gas flow is made to flow a second time in opposite direction. In other words, according to such an alternative embodiment, the gas flow coming from detection zone 13 passes through the first sensor 19 by flowing along the duct in a first direction towards suction fan 25, and then in the opposite direction towards sensor 19. Clearly in this embodiment a single and unique sensor could even be provided.

Hereinafter a particular signal processing modality will be described, which can be applied to the embodiments of the invention in which at least two gas sensors, preferably six sensors, connected in parallel are provided and are arranged to intercept the gas flows coming from detection zone 13 along corresponding ducts 21. Such a signal processing modality can be applied for instance to the embodiment of apparatus 11 shown in FIG. 1C. Such a particular processing modality provides for correlating the signals of multiple sensors connected in parallel by means of convolution techniques applied to sensor pairs. If the correlation degree exceeds a certain factor (for instance >+0.8 or <−0.8), pre-processing operation are performed on the signals, allowing subtracting from each signal a noise signal, or external perturbation signal, which is common to a plurality of sensors and appears as a constant offset or a linear (increasing or decreasing) signal.

The pre-processing step includes sampling the signals of two channels and consequently signal intensities $SS_1$ and $SS_2$ of two gas sensors. Each signal $SS_1$, once it has been digitised, can be represented as an array of points having a length depending on the sampling and the duration of the measurement. The Pearson correlation index, which is defined as the covariance divided by the product of standard deviations σ of the two variables, is considered for each signal pair:

$$\rho_{SS1\ SS2} = \sigma_{SS1\ SS2}/(\sigma_{SS1}, \sigma_{SS2})$$

where $\sigma_{SS1\ SS2}$ is the covariance between two signals $SS_1$ and $SS_2$, and $\sigma_{SS1}$ and $\sigma_{SS2}$ are the two standard deviations.

When the Pearson index exceeds +0.8 or is below −0.8, a strong correlation exists. The Pearson index is calculated among all combinations of pairs of signals $SS_N$.

Denoting by N the number of channels, the independent combinations are given by (N·(N−1))/2.

For instance, if N=6 (i.e. six is the number of independent channels, according to a preferred embodiment of the invention). the fifteen following pairs are obtained:
(1 2) (1 3) (1 4) (1 5) (1 6)
(2 3) (2 4) (2 5) (2 6)
(3 4) (3 5) (3 6)
(4 5) (4 6)

For all combinations, if all Pearson indexes exceed +0.8 or are below −0.8, then the signals are mutually correlated and this indicates that background variations exist.

In such case, the array of average signal $SS_m$ of all channels is subtracted from all signals $SS_n$, and the new value of $*SS_N$ will be $$*SS_1 := SS_1 - SS_m$$
$$*SS_2 := SS_2 - SS_m$$
$$\ldots$$
$$*SS_n := SS_n - SS_m$$

According to the invention, such a detection method can be implemented in the absence of or in the combination with the function of modifying the gas mixture in the vicinity of the container disclosed above and actuated in the flushing step.

INDUSTRIAL APPLICABILITY

The invention finds industrial application in several fields, for detecting leaks and micro-leaks from containers of substantially any kind, either compressible or rigid. The invention can also be applied for detecting leakages of liquids, for instance water or beverages, from pressurised rigid containers.

The invention as described and illustrated can undergo several variants and modifications falling within the same inventive principle.

The invention claimed is:
1. A method for detecting leakages from sealed containers, said method comprising the steps of:
defining a detection zone (13) in which a sealed container (CT) will be placed;

putting said detection zone (13) in communication with a pair of gas sensors (219a, 219b) through a duct (21a, 21b) the pair of gas sensors (219a, 219b) including a first gas sensor (219a) and a second gas sensor (219b) and being connected in series to each other by a segment (21a) of said duct (21), the inner volume of which is known and which determines a corresponding delay line in gas propagation along the duct (21);

introducing a flushing gas into said detection zone (13) by making said flushing gas flow through said duct (21) in a first direction;

placing a container (CT) in said detection zone (13);

sucking gas from said detection zone (13) and transferring it to the pair of gas sensors (219a, 219b) for ascertaining a presence of a gas leakage in said container (CT), said gas being transferred from said detection zone (13) to said pair of gas sensors (219a, 219b) by making it flow through said duct (21) in a second direction opposite to said first direction obtaining a corresponding signal ($M_1$, $M_2$) from said pair of gas sensors (219a, 219b) and sending each corresponding signal ($M_1$, $M_2$) to a comparator (210); and obtaining an output signal ($M_3$) from the comparator (210), the output signal ($M_3$) being indicative of a presence of a leakage from a container present in the detection zone (13) when the signal ($M_2$) of the second sensor (219b) exceeds a floating threshold determined by the variable signal ($M_1$) of the first sensor (219a) at the same time instant.

2. The method according to claim 1, wherein said detection zone (13) communicates with the atmosphere.

3. The method according to claim 1, wherein there is further provided a step of subjecting said container (CT), when placed in said detection zone (13), to squeezing for promoting possible spillage of fluid from said container (CT) through an opening that may be provided in said container.

4. The method according to claim 2, wherein said introducing and sucking steps are carried out by means of a flushing gas blower (23) and a suction fan (25), respectively, both communicating with the detection zone (13) through said duct (21).

5. The method according to claim 1, wherein said introducing and sucking steps are carried out by means of a flushing gas blower (23) and a suction fan (25), respectively, both communicating with the detection zone (13) through said duct (21).

6. The method according to claim 5, wherein, in said introducing step, the flushing gas introduced into the detection zone (13) is taken from a controlled environment containing said flushing gas, and in said sucking step the gas sucked from the detection zone (13) is exhausted to a non-controlled environment.

7. The method according to claim 1, wherein said introducing and sucking steps are carried out by means of a single unit (31), acting both as a suction fan and as a flushing gas blower, by means of a flow reversing circuit provided with a switching valve (33) and communicating with the detection zone (13) through said duct (21).

8. The method according to claim 1, wherein said introducing and sucking steps are carried out by means of a single unit (31'), acting both as a suction fan and as a blower, wherein the single unit (31') is connected to a circuit equipped with a valve (27') arranged to put in communication:

in said sucking step, the duct (21) communicating with the detection zone (13) with an inlet port (31'a) of the single unit (31'), and an outlet port (31'b) of the single unit (31') with the outside environment, or in said introducing step, the duct (21) communicating with the detection zone (13) with the outlet port (31'b) of the single unit (31'), and the inlet port (31'a) of the single unit (31') with a controlled environment containing flushing gas.

9. The method according to claim 1, wherein there is further provided a step of subjecting said container (CT), when placed in said detection zone (13), to squeezing for promoting possible spillage of fluid from said container (CT) through an opening that may be provided in said container.

10. The method according to claim 9, wherein said introducing and sucking steps are carried out by means of a flushing gas blower (23) and a suction fan (25), respectively, both communicating with the detection zone (13) through said duct (21).

11. An apparatus for detecting leakages from sealed containers, said apparatus comprising:

a detection zone (13) adapted to receive a sealed container (CT);

a pair of gas sensors (219a, 219b) including a first sensor (219a) and a second sensor (219b);

a duct (21) communicating with said detection zone (13) and said pair of gas sensors (219a, 219b);

a flushing gas blower (23) provided with an outlet port (23a) for said flushing gases, said outlet port (23a) communicating with said duct (21) said blower (23) being configured for introducing a flushing gas into said detection zone (13) by making said flushing gas flow through said duct (21) in a first direction;

a suction fan (25) provided with an inlet port (25a) from which air is sucked, said inlet port (25a) communicating with said duct (21), said suction fan (25) being configured for sucking gas from said detection zone (13) by making said gas flow through said duct (21) in a second direction opposite to said first direction;

wherein the pair of gas sensors (219a, 219b) are connected in series to each other by a segment (21a) of said duct (21), the inner volume of which is known and which determines a corresponding delay line in gas propagation along the duct (21) communicating with the detection zone (13); and wherein a corresponding signal ($M_1$, $M_2$) coming from said pair of gas sensors (219a, 219b) is sent to a comparator (210), whereby a signal ($M_3$) outputted by said comparator (210) is indicative of a presence of a leakage from a container present in the detection zone (13), when the signal ($M_2$) of the second sensor (219b) exceeds a floating threshold determined by the variable signal ($M_1$) of the first sensor (219a) at the same time instant.

12. The apparatus according to claim 11, wherein the suction fan (25) is connected to a non-controlled environment to which it exhausts the gas sucked from the detection zone (13), and the flushing gas blower (23) is connected to a controlled environment from which it takes flushing gas.

13. The apparatus according to claim 12, wherein said gas sensor (219a, 219b) is located along said duct (21) between the detection zone (13) and the suction fan (25) or blower (23).

14. The apparatus according to claim 11, wherein said blower and said suction fan are a single unit (31'), said single unit (31') being connected to a circuit equipped with a valve (27'), said valve being configured for putting in communication:

the duct (21) with an inlet port (31'*a*) of the single unit (31'), and an outlet port (31'*b*) of the single unit (31') with the outside environment, or the duct (21) with the outlet port (31'*b*) of the single unit (31'), and the inlet port (31'*a*) of the single unit (31') with a controlled environment containing flushing gas.

15. The apparatus according to claim 14, wherein said pari of gas sensors (219*a*, 219*b*) is located along said duct (21) between the detection zone (13) and the suction fan (25) or blower (23).

16. The apparatus according to claim 11, wherein said duct (21) communicates with said detection zone (13) through at least one diffuser (29).

17. The apparatus according to claim 11, wherein a suction head (71*a* . . . 71*d*) comprising a plurality of slots (73) for sucking and introducing gases is arranged in the detection zone (13).

18. The apparatus according to claim 17, wherein the slots (73) are arranged along a peripheral band substantially surrounding a whole sample container when the latter passes through the detection zone (13).

19. The apparatus according to claim 1, wherein said pair of gas sensors (19; 219*a*, 219*b*) is located along said duct (21) between the detection zone (13) and the suction fan (25) or blower (23).

* * * * *